United States Patent
Ito

(10) Patent No.: US 7,974,111 B2
(45) Date of Patent: Jul. 5, 2011

(54) DC/DC CONVERTER AND SEMICONDUCTOR DEVICE USING DC/DC CONVERTER

(75) Inventor: Masafumi Ito, Okazaki (JP)

(73) Assignee: Semiconductor Energy Laboratory Co., Ltd., Atsugi-shi, Kanagawa-ken (JP)

( * ) Notice: Subject to any disclaimer, the term of this patent is extended or adjusted under 35 U.S.C. 154(b) by 264 days.

(21) Appl. No.: 12/000,320

(22) Filed: Dec. 11, 2007

(65) Prior Publication Data

US 2008/0143425 A1 Jun. 19, 2008

(30) Foreign Application Priority Data

Dec. 13, 2006 (JP) ................................. 2006-335643

(51) Int. Cl.
*H02H 7/122* (2006.01)
(52) U.S. Cl. ..................................................... 363/56.01
(58) Field of Classification Search .................. 363/21.1, 363/56.12, 59, 56.01; 320/120, 124–126
See application file for complete search history.

(56) References Cited

U.S. PATENT DOCUMENTS

| | | | |
|---|---|---|---|
| 5,691,556 A | 11/1997 | Saito et al. | |
| 5,892,267 A * | 4/1999 | Takada | 327/536 |
| 6,525,595 B2 * | 2/2003 | Oku | 327/536 |
| 6,888,399 B2 * | 5/2005 | Nakagawa et al. | 327/536 |
| 7,148,740 B2 * | 12/2006 | Kobayashi et al. | 327/536 |
| 7,190,211 B2 * | 3/2007 | Nakagawa et al. | 327/536 |
| 2005/0133605 A1 * | 6/2005 | Koyama et al. | 235/492 |
| 2005/0206441 A1 * | 9/2005 | Kimura | 327/536 |
| 2006/0022298 A1 * | 2/2006 | Shiraishi et al. | 257/509 |
| 2006/0267769 A1 * | 11/2006 | Ito et al. | 340/572.1 |
| 2007/0122964 A1 | 5/2007 | Nakagawa et al. | |
| 2008/0093934 A1 * | 4/2008 | Kato | 307/149 |
| 2008/0210762 A1 | 9/2008 | Osada et al. | |
| 2008/0273357 A1 * | 11/2008 | Matsumoto et al. | 363/59 |

FOREIGN PATENT DOCUMENTS

| | | |
|---|---|---|
| JP | 2003-297936 | 10/2003 |
| JP | 2006-109429 | 4/2006 |
| WO | 2006/028258 A1 | 3/2006 |

* cited by examiner

*Primary Examiner* — Adolf Berhane
*Assistant Examiner* — Yemane Mehari
(74) *Attorney, Agent, or Firm* — Fish & Richardson P.C.

(57) ABSTRACT

It is an object to provide a DC/DC converter that can stabilize power supply potential in use. It is another object to provide a semiconductor device in which circuit operation is stabilized. In addition to a power supply that supplies potential to be reference potential of boosting in a DC/DC converter, a power supply for charging a capacitor in the DC/DC converter is provided. Accordingly, loads to the power supply that supplies the reference potential of boosting can be reduced. Further, as power for charging the capacitor in the DC/DC converter, power supplied from not an antenna but a secondary battery is used. More specifically, a secondary battery is used as a power supply that supplies power to a buffer circuit or an inverter circuit. Thus, power supplied from the antenna can be stabilized. In other words, operation of a logic circuit and an analog circuit can be stabilized.

17 Claims, 15 Drawing Sheets

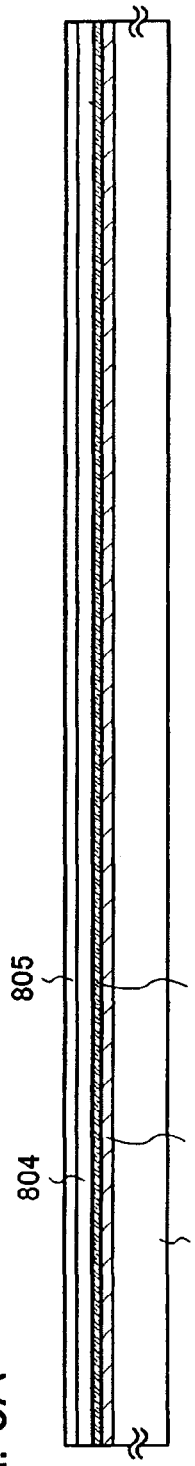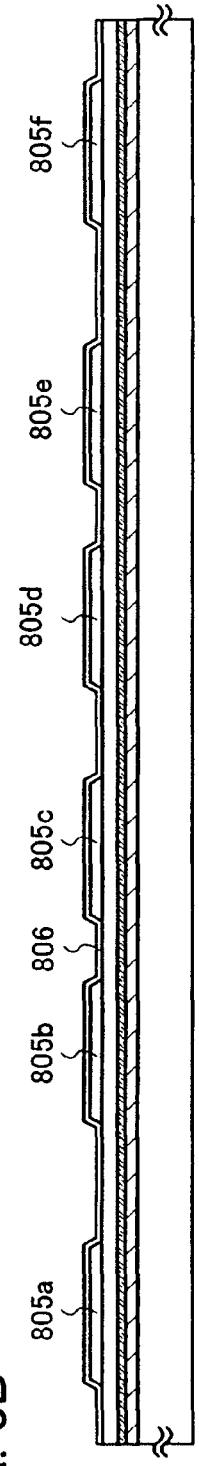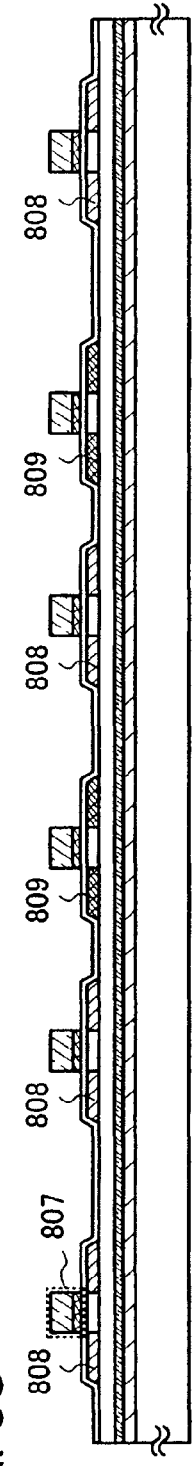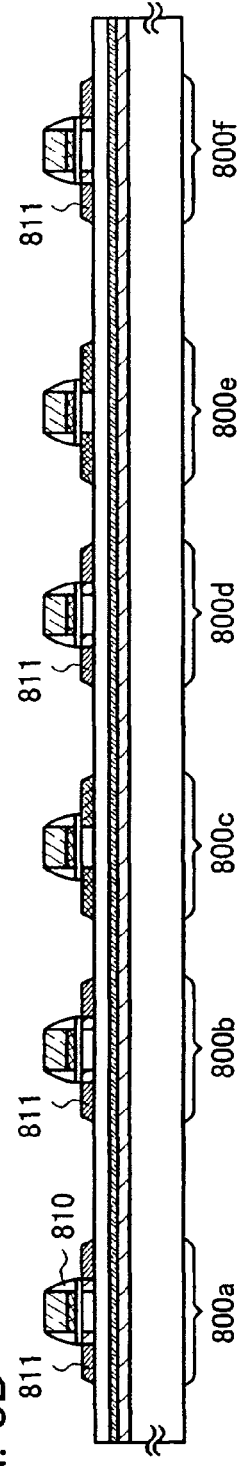

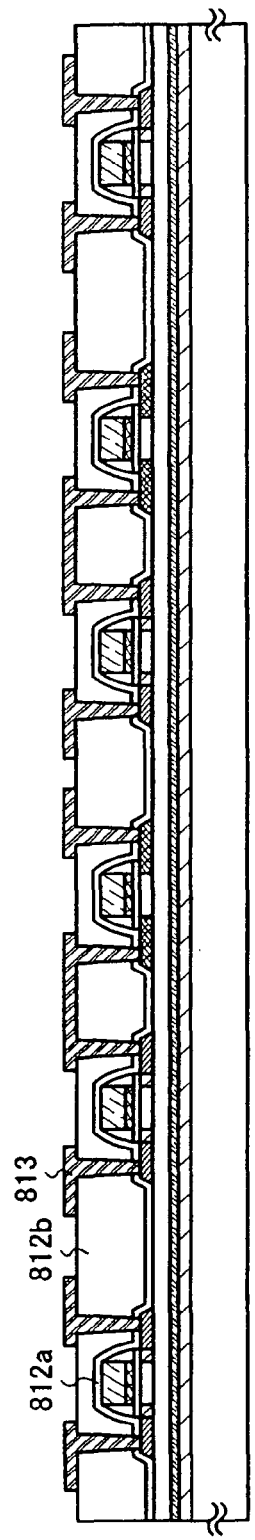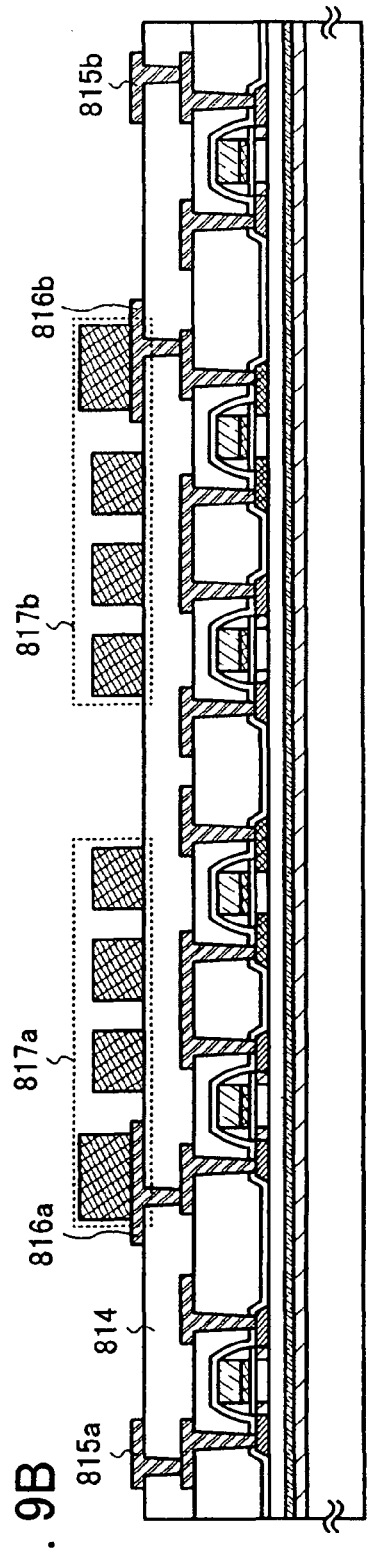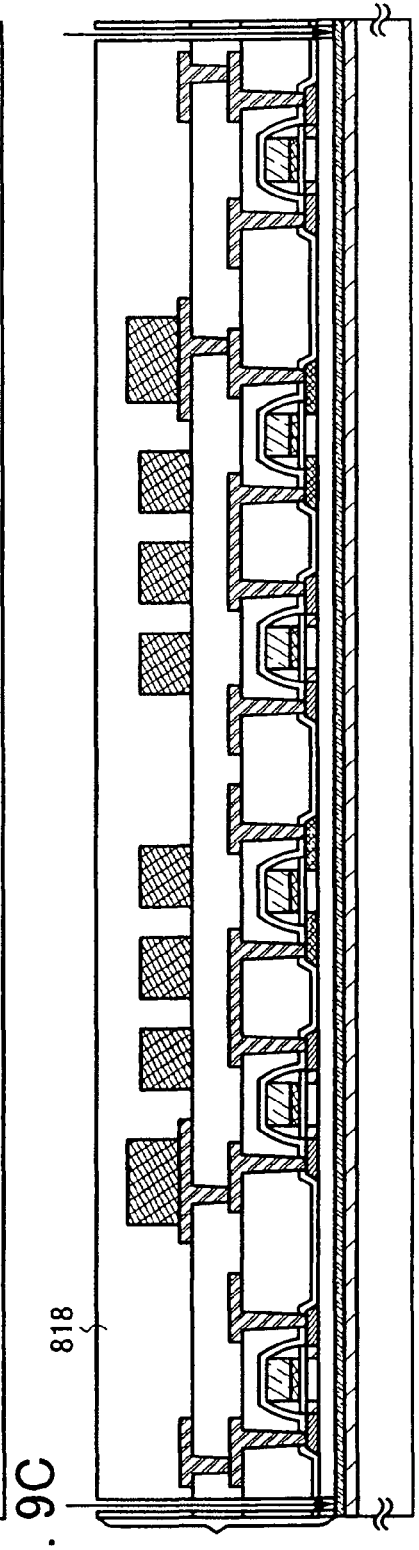

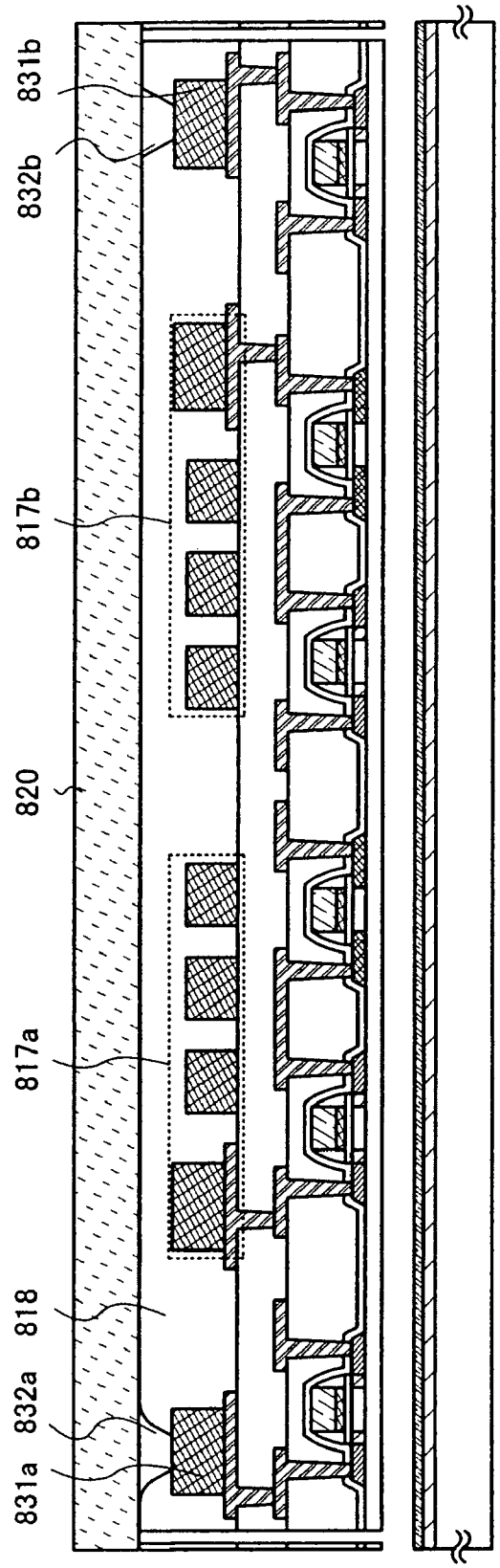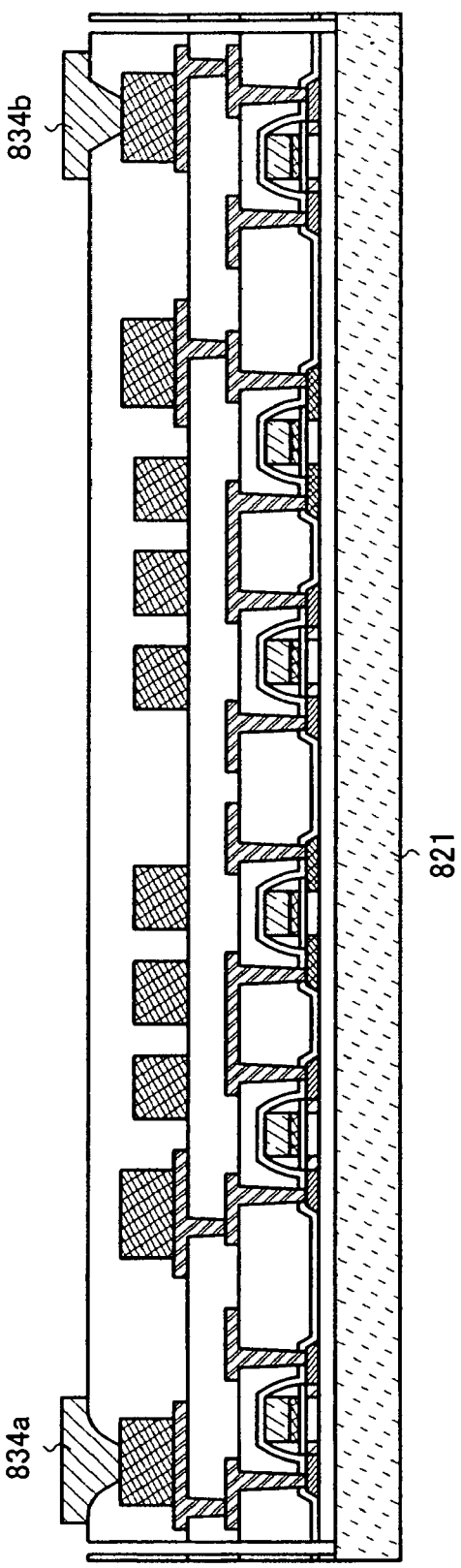

1300

1300

1300

1300

1300

1300

US 7,974,111 B2

DC/DC CONVERTER AND SEMICONDUCTOR DEVICE USING DC/DC CONVERTER

BACKGROUND OF THE INVENTION

1. Field of the Invention

The present invention relates to a DC/DC converter (also called as a boosting circuit) and a semiconductor device using the DC/DC converter.

2. Description of the Related Art

In recent years, wireless chips which transmit and receive data wirelessly have been developed actively. The wireless chips which transmit and receive data are called an RFID (Radio Frequency Identification) tag, an RF tag, an RF chip, a wireless tag, a wireless processor, a wireless memory, an IC (Integrated Circuit) tag, an IC label, an electronic tag, an electronic chip, or the like. The wireless chips using a silicon substrate is the mainstream in the wireless chips which has already been put into practice.

The wireless chips which transmit and receive data wirelessly (hereinafter, referred to as RFID tags) generally have a structure in which inside circuits are made to operate by power obtained wirelessly. In the structure, each circuit is made to operate by using power from an antenna via a power supply circuit, a constant voltage circuit, or the like. That is, it can be considered that the power is supplied from only an antenna circuit.

Further, as the RFID tag becomes to have a higher function, it is required to mount a circuit needing high voltage for operation. For example, in the case where a floating gate type nonvolatile memory is mounted on the RFID tag, it is necessary to increase voltage to be high for power supplied from the power supply circuit or the constant voltage circuit. This is caused by the principle of the nonvolatile memory needing the high voltage when data is written. As long as such memory is used, it is difficult to avoid increase of the voltage. In order to satisfy the requirement of high voltage, a structure is considered, in which an RFID tag is provided with a DC/DC converter (see Reference 1: Japanese Published Patent Application No. 2006-109429).

SUMMARY OF THE INVENTION

FIG. 14A is an example of a DC/DC converter in which boosting of four stages is performed. In FIG. 14A, potential of an input terminal of a first diode 1402 is a power supply potential Vdd, and an input terminal of a second diode 1404 and one of terminals of a first capacitor 1412 are connected to an output terminal of the first diode 1402. Similarly, an input terminal of a third diode 1406 and one of terminals of a second capacitor 1414 are connected to an output terminal of the second diode 1404. Connections of other parts are similar to the above, and therefore, detailed explanation is omitted. However, the connection can be represented as follows: one of terminals of an n-th capacitor is connected to an output terminal of an n-th diode (n: an integer). In addition, an input terminal of the n-th diode is connected to an output terminal of a (n−1)-th diode. Note that an output terminal of a fifth diode 1410 is connected to one of terminals of a fifth capacitor, and it is an output terminal Vout of the DC/DC converter.

Further, the other terminal of the first capacitor 1412 and the other terminal of a third capacitor 1416 are connected to an output terminal of a buffer circuit 1422 and an input terminal of an inverter circuit 1424. The other terminal of the second capacitor 1414 and the other terminal of a fourth capacitor 1418 are connected to an output terminal of the inverter circuit 1424. In other words, it can be considered that a (2k−1)-th capacitor is connected to the output terminal of the buffer circuit 1422 and the input terminal of the inverter circuit 1424, and a 2k-th capacitor is connected to the output terminal of the inverter circuit 1424 (k: an integer). However, as potential of the other terminal of the fifth capacitor 1420, ground potential GND is inputted. A clock pulse CLK is inputted to the input terminal of the buffer circuit 1422. In this specification, although a CMOS inverter circuit using a transistor is particularly referred to as an inverter circuit, it is not particularly limited to use the inverter circuit because the DC/DC converter functions as long as the circuit has a function of a NOT circuit.

FIG. 14B is an example of a detail of the buffer circuit 1422 in FIG. 14A, and FIG. 14C is an example of a detail of the inverter circuit 1424 in FIG. 14A.

The buffer circuit 1422 has a structure in which inverter circuits of two stages are connected in series. Specifically, the buffer circuit 1422 includes p-channel transistors 1432 and 1442 and n-channel transistors 1434 and 1444. Here, the clock pulse CLK is inputted to a gate electrode of the p-channel transistor 1432 and a gate electrode of the n-channel transistor 1434. The power supply potential Vdd is inputted to one of a source electrode and a drain electrode of the p-channel transistor 1432, and the ground potential GND is inputted to one of a source electrode and a drain electrode of the n-channel transistor 1434. Then, the other of the source electrode and the drain electrode of the p-channel transistor 1432 is connected to the other of the source electrode and the drain electrode of the n-channel transistor 1434, and potential is inputted to a gate electrode of the p-channel transistor 1442 and a gate electrode of the n-channel transistor 1444 included in the inverter circuit in the next stage.

The connection of the p-channel transistor 1442 and the n-channel transistor 1444 is almost the same as that of the p-channel transistor 1432 and the n-channel transistor 1434. The power supply potential Vdd is inputted to one of a source electrode and a drain electrode of the p-channel transistor 1442, and the ground potential GND is inputted to one of a source electrode and a drain electrode of the n-channel transistor 1444. The other of the source electrode and the drain electrode of the p-channel transistor 1442 is connected to the other of the source electrode and the drain electrode of the n-channel transistor 1444 to be an output terminal. Then, "out 1" is outputted from the output terminal.

The inverter circuit 1424 includes a p-channel transistor 1452 and an n-channel transistor 1454. Here, the output terminal of the buffer circuit 1422 is connected to a gate electrode of the p-channel transistor 1452 and a gate electrode of the n-channel transistor 1454. Therefore, the output "out 1" of the buffer circuit 1422 is inputted to the inverter circuit 1424. The power supply potential Vdd is inputted to one of a source electrode and a drain electrode of the p-channel transistor 1452, and the ground potential GND is inputted to one of a source electrode and a drain electrode of the n-channel transistor 1454. The other of the source electrode and the drain electrode of the p-channel transistor 1452 is connected to the other of the source electrode and the drain electrode of the n-channel transistor 1454 to be an output terminal of the inverter circuit 1424. Then, "out 2" is outputted from the output terminal.

When a clock pulse CLK is High, the p-channel transistor 1432 is turned OFF, and the n-channel transistor 1434 is turned ON in the buffer circuit 1422; therefore, the ground potential GND, that is, Low is inputted to the gate electrodes of the p-channel transistor 1442 and the n-channel transistor 1444. Accordingly, the p-channel transistor 1442 is turned ON, and the n-channel transistor 1444 is turned OFF in the buffer circuit 1422. As a result, the output "out 1" of the buffer circuit 1422 becomes the power supply potential Vdd, that is, High. At this time, the input terminal of the inverter circuit 1424 is High; therefore, the p-channel transistor 1452 is turned OFF, and the n-channel transistor 1454 is turned ON. As a result, the output "out 2" of the inverter circuit 1424 becomes Low. On the contrary, when the clock pulse CLK is Low, the output "out 1" of the buffer circuit 1422 is Low, and the output "out 2" of the inverter circuit 1424 is High.

When the clock pulse CLK is High, the output "out 1" of the buffer circuit 1422 is High; therefore, the first capacitor 1412 and the third capacitor 1416 are charged, and potential of a node N1 and a node N3 is increased to the predetermined value. Accordingly, charges flow through the second diode 1404 and a fourth diode 1408, and potential of a node N2 and a node N4 is increased to the predetermined value. Next, when the clock pulse CLK becomes Low, the output "out 1" of the buffer circuit 1422 is Low, and the output "out 2" of the inverter circuit 1424 is High; therefore, the potential of the node N2 and the node N4 is further increased. Accordingly, potential of the node N3 and the node N5 is increased to be the predetermined potential. As described, potential of the nodes has a relation of $V_{N5} > V_{N4} > V_{N3} > V_{N2} > V_{N1} > Vdd$, whereby boosting is performed.

FIG. 15 shows an example of a structure of an RFID tag in which a DC/DC converter is used. An antenna 1502 is connected to an input terminal of a power supply circuit 1504, and an output terminal of the power supply circuit 1504 is connected to an input terminal of a constant voltage circuit 1506. An output terminal of the constant voltage circuit 1506 is connected to an input terminal of a DC/DC converter 1508, a logic circuit 1510, and an analog circuit 1512, and an output terminal of the DC/DC converter 1508 is connected to a memory circuit 1514. Note that the structure of FIG. 15 is a schematic view for clarifying flow of power, and there are a plurality of connection relations other than the connection relation shown in FIG. 15.

Here, since a capacitor in the DC/DC converter 1508 has high capacity, a large amount of power is needed to charge the capacitor. Since the clock pulse used for the boosting is in the vicinity of MHz band, high speed charging is necessary to be performed. That is, a power supply of the buffer circuit and the inverter circuit used for the DC/DC converter is needed to withstand the charge of a capacitor that operate at high speed and has high capacity. However, the power that can be obtained wirelessly is by no means high, and the output of the constant voltage circuit 1506 is significantly reduced by operation of the DC/DC converter. That is, the operation of the logic circuit 1510 and the analog circuit 1512 becomes unstable. Specifically, problems arise, such as timing violation by delay of pulse rising, defect of generation of a reset signal, or defects of reading a memory caused.

Although boosting of four stages is performed in the conventional DC/DC converter shown in FIGS. 14A to 14C, it is necessary to perform boosting of four or more stages or increase capacitance of each capacitor in order to enhance boosting capability. That is, the higher power supply capability is needed.

In view of the foregoing problems, it is an object of the present invention to provide a DC/DC converter in which stability of power supply potential in use can be achieved.

It is another object of the present invention to provide a semiconductor device in which stability of circuit operation is improved.

In the present invention, a power supply that charges a capacitor in a DC/DC converter is provided, which is different from a power supply that supplies potential to be reference potential of boosting in the DC/DC converter. More specifically, a power supply for supplying power to a buffer circuit or an inverter circuit is separately provided. Accordingly, load to the power supply that supplies reference potential of boosting can be reduced.

Further, in the present invention, power that is supplied from not an antenna but a secondary battery is used as power for charging a capacitor in the DC/DC converter. More specifically, a secondary battery is used as a power supply for supplying power to the buffer circuit or the inverter circuit. Accordingly, power supplied from the antenna can be stabilized. In other words, operation of a logic circuit or an analog circuit can be stabilized. Note that a secondary battery in the present invention mainly refers to a secondary battery that can be charged wirelessly (without contact) by receiving an electromagnetic wave. However, the present invention is not limited thereto. That is, in the present invention, a secondary battery that is charged by receiving power directly with a wire (with contact) can also be used. Needless to say, in the purpose of the present invention of supplying power stably, the power supply is not limited to a secondary battery, but a primary battery may be used.

One aspect of a DC/DC converter of the present invention is a DC/DC converter to increase a potential of a first power supply. A potential inputted to a capacitor in the DC/DC converter is supplied from a second power supply.

Another aspect of a DC/DC converter of the present invention is a DC/DC converter to increase a potential of a first power supply. A potential of a second power supply or a third power supply is selectively supplied to a capacitor in the DC/DC converter.

Another aspect of a DC/DC converter of the present invention includes at least a first diode and a second diode each having rectification from an input to an output and a capacitor. The output side of the first diode is connected to the input side of the second diode and one of terminals of the capacitor. The input of the first diode is a first potential. A potential of the other terminal of the capacitor is at a second potential or a third potential. The first potential is supplied from a first power supply, and the second potential is supplied from a second power supply.

Another aspect of a DC/DC converter of the present invention includes n number of diodes connected in series and (n−1) number of capacitors (n: an integer, $2 \leq n$). A circuit to supply a first potential is connected to an input terminal of a first diode. One of terminals of a (m−1)-th capacitor is connected to an input terminal of a m-th diode (m: an integer, $2 \leq m \leq n$). A circuit to supply a second potential or a third potential selectively is connected to the other terminals of the (n−1) number of capacitors. The first potential is supplied from a first power supply, and the second potential is supplied from a second power supply.

Another aspect of a DC/DC converter of the present invention includes n number of diodes connected in series and n number of capacitors (n: an integer, $2 \leq n$). A circuit to supply a first potential is connected to an input terminal of a first diode. One of terminals of a m-th capacitor is connected to an output terminal of a m-th diode (m: an integer, $1 \leq m \leq n$). A circuit to supply a second potential or a third potential selectively is connected to the other terminals of the first to (n−1)-th capacitors. The third potential is supplied to the other terminal of an n-th capacitor. The first potential is supplied from a first power supply, and the second potential is supplied from a second power supply.

Another aspect of a DC/DC converter of the present invention includes n number of diodes connected in series and (n−1) number of capacitors (n: an integer, 3≦n). A circuit to supply a first potential is connected to an input terminal of a first diode. One of terminals of a (m−1)-th capacitor is connected to an input terminal of a m-th diode (m: an integer, 2≦m≦n). A potential supply circuit to supply a second potential or a third potential selectively is connected to the other terminals of the (n−1) number of capacitors. The potential supply circuit is a circuit by which the third potential is supplied to the other terminal of a (2k−1)-th capacitor when the second potential is supplied to the other terminal of a 2k-th capacitor (k: an integer, 2k≦n−1 and 2k−1≦n−1), and by which the second potential is supplied to the other terminal of the (2k−1)-th capacitor when the third potential is supplied to the other terminal of the 2k-th capacitor.

Another aspect of a DC/DC converter of the present invention includes n number of diodes connected in series and n number of capacitors (n: an integer, 3≦n). A circuit to supply a first potential is connected to an input terminal of a first diode. One of terminals of a m-th capacitor is connected to an output terminal of a m-th diode (m: an integer, 1≦m≦n). A potential supply circuit to supply a second potential or a third potential selectively is connected to the other terminals of first to (n−1)-th capacitors. The third potential is supplied to the other terminal of an n-th capacitor. The potential supply circuit is a circuit by which the third potential is supplied to the other terminal of a (2k−1)-th capacitor when the second potential is supplied to the other terminal of a 2k-th capacitor (k: an integer, 2k≦n−1 and 2k−1≦n−1), and by which the second potential is supplied to the other terminal of the (2k−1)-th capacitor when the third potential is supplied to the other terminal of the 2k-th capacitor.

In the above structure, the third potential can be a ground potential. Further, it is preferable that the second potential and the third potential be alternately supplied by the circuit to supply potential selectively (potential supply circuit).

In the above structure, the circuit to supply potential selectively (potential supply circuit) may be provided with a buffer circuit or an inverter circuit. As the second power supply, a primary battery or a secondary battery may be used. As the first power supply, a primary battery or a secondary battery may be used. In the case of using the secondary battery, a secondary battery that is charged by receiving supply of power wirelessly is preferably used.

One aspect of a semiconductor device of the present invention is a semiconductor device including a DC/DC converter to increase a first potential from an antenna. A potential inputted to a capacitor in the DC/DC converter is a second potential from a secondary battery.

Another aspect of a semiconductor device of the present invention is a semiconductor device including a DC/DC converter to increase a first potential from an antenna, which includes a circuit to supply a second potential or a third potential from a secondary battery selectively to a capacitor in the DC/DC converter.

Another aspect of a semiconductor device of the present invention includes n number of diodes connected in series and (n−1) number of capacitors (n: an integer, 2≦n). A first potential is supplied from an antenna to an input terminal of a first diode. One of terminals of a (m−1)-th capacitor is connected to an input terminal of a m-th diode (m: an integer, 2≦m≦n). A circuit to supply a second potential or a third potential selectively from a secondary battery is connected to the other terminals of the (n−1) number of capacitors.

Another aspect of a semiconductor device of the present invention includes n number of diodes connected in series and n number of capacitors (n: an integer, 2≦n). A first potential is supplied from an antenna to an input terminal of a first diode. One of terminals of a m-th capacitor is connected to an output terminal of a m-th diode (m: an integer, 1≦m≦n). A circuit to supply a second potential or a third potential selectively from a secondary battery is connected to the other terminals of first to (n−1)-th capacitors. The third potential is supplied to the other terminal of an n-th capacitor.

Another aspect of a semiconductor device of the present invention includes n number of diodes connected in series and (n−1) number of capacitors (n: an integer, 3≦n). A first potential is supplied from an antenna to an input terminal of a first diode. One of terminals of a (m−1)-th capacitor is connected to an input terminal of a m-th diode (m: an integer, 2≦m≦n). A potential supply circuit to supply a second potential or a third potential selectively from a secondary battery is connected to the other terminals of (n−1) number of capacitors. The potential supply circuit is a circuit by which a third potential is supplied to the other terminal of a (2k−1)-th capacitor when the second potential is supplied to the other terminal of a 2k-th capacitor (k: an integer, 2k≦n−1 and 2k−1≦n−1), and by which the second potential is supplied to the other terminal of the (2k−1)-th capacitor when the third potential is supplied to the other terminal of the 2k-th capacitor.

Another aspect of a semiconductor device of the present invention includes n number of diodes connected in series and n number of capacitors (n: an integer, 3≦n). A first potential is supplied from an antenna to an input terminal of a first diode. One of terminals of a m-th capacitor is connected to an output terminal of a m-th diode (m: an integer, 1≦m≦n). A potential supply circuit to supply a second potential or a third potential selectively from a secondary battery is connected to the other terminals of first to (n−1)-th capacitors. A circuit to supply the third potential is connected to the other terminal of an n-th capacitor. The potential supply circuit is a circuit by which the third potential is supplied to the other terminal of a (2k−1)-th capacitor when the second potential is supplied to the other terminal of a 2k-th capacitor (k: an integer, 2k≦n−1 and 2k−1≦n−1), and by which the second potential of supplied to the other terminal of the (2k−1)-th capacitor when the third potential is supplied to the other terminal of the 2k-th capacitor.

In the above structure, the third potential can be a ground potential. Further, it is preferable that the second potential and the third potential be alternately supplied by the circuit to supply potential selectively (potential supply circuit).

In the above structure, the circuit to supply potential selectively (potential supply circuit) may provided with a buffer circuit or an inverter circuit. Further, in the above structure, the secondary battery is preferably a secondary battery that is charged by receiving supply of power wirelessly. Furthermore, in the above structure, instead of the potential supplied from the antenna, a potential from a secondary battery that is charged by receiving supply of power wirelessly may be used.

By using a DC/DC converter of the present invention, power that is supplied to another circuit can be stabilized. Thus, operation defects of another circuit can be reduced.

Further, by manufacturing a semiconductor device using a DC/DC converter of the present invention, power that is supplied from an antenna can be stabilized. Thus, operation defects of another circuit can be reduced. In addition, the response output to the external of the semiconductor device can be prevented from reduction. In other words, the communication distance can be increased. Furthermore, a large amount of power can be used in comparison with the case using power supplied from an antenna; therefore, boosting capability of the DC/DC converter can be improved.

Further, since the power supply potential is not reduced or is just slightly reduced in the second power supply, the capacitor included in the DC/DC converter can be charged at high speed, and the boosting time can be shortened. By supplying power to the DC/DC converter using a circuit which is different from a circuit supplying power to another circuit, conditions of power that are required for another circuit can be eased, and therefore, a size of another circuit can be enlarged. When a primary battery or a secondary battery is used as the second power supply, a noise caused by the power supply can be reduced.

Furthermore, by using a secondary battery that can be charged wirelessly as the second power supply, complicate charge operation is unnecessary. In addition, the battery is just slightly deteriorated with time in comparison with the case of using the primary battery, and exchange of the battery is unnecessary.

BRIEF DESCRIPTION OF THE DRAWINGS

FIGS. 8A to 8D are views showing a method for manufacturing a semiconductor device of the present invention.

FIGS. 9A to 9C are views showing a method for manufacturing a semiconductor device of the present invention.

FIGS. 11A and 11B are views showing a method for manufacturing a semiconductor device of the present invention.

DETAILED DESCRIPTION OF THE INVENTION

Figure 1A:
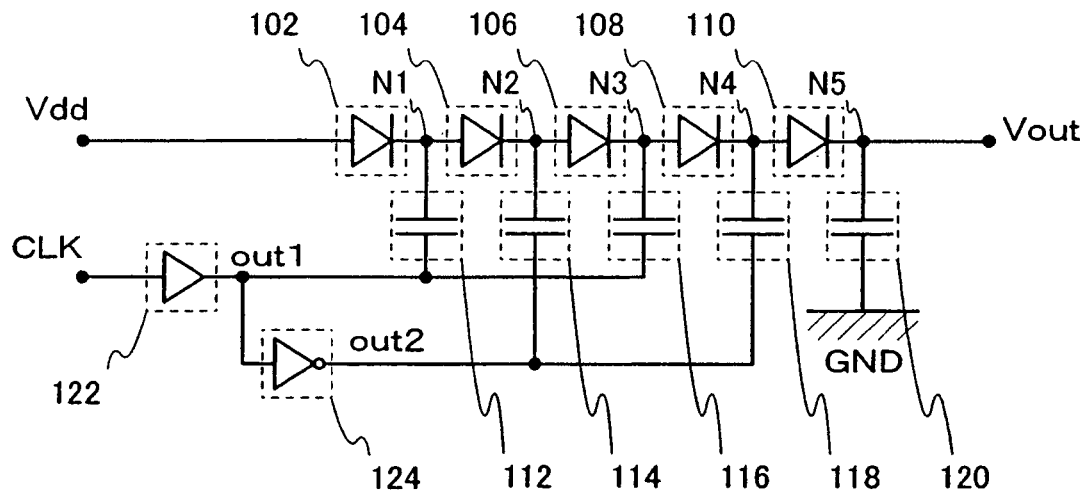
FIGS. 1A to 1C are diagrams showing a structure of a DC/DC converter of the present invention.

Embodiment modes of the present invention will be described with reference to the accompanying drawings. However, the present invention is not limited to the following description, and it is easily understood by those skilled in the art that various changes and modifications in modes and details thereof are possible, unless such changes and modifications depart from the sprit and the scope of the invention. Therefore, the present invention is not construed as being limited to the description of the following embodiment modes. It is to be noted that like portions in the drawings of the present invention to be given below may be denoted by like reference numerals.

The present invention can be applied to a semiconductor device which uses any frequency mode, for example, a long wave band (135 kHz or the like), a short wave band (6.78 MHz, 13.56 MHz, 27.125 MHz, 40.68 MHz, or the like), an ultra-short wave band (433.92 MHz, 869.0 MHz, 915.0 MHz, or the like), a microwave band (2.45 GHz, 5.8 GHz, 24.125 GHz, or the like), or the like without being limited to a specific frequency mode. A frequency mode may be selected as appropriate depending on request of a communication distance, directivity, or the like.

In the present specification, a term "connection" indicates electrical connection. For example, a sentence "a terminal and a wiring are connected" indicates a state in which a terminal and a wiring are electrically connected, and it does not exclude a structure in which some elements are provided between the terminal and the wiring. In the present specification, although a CMOS inverter circuit using a transistor is specifically referred to as an inverter circuit, another circuit having function as a NOT circuit can be used instead of the CMOS circuit, and the inverter circuit is not particularly limited to the CMOS inverter circuit.

Embodiment Mode 1

This embodiment mode will describe a basic structure of a DC/DC converter of the present invention with reference to FIGS. 1A to 1C and FIG. 2.

FIG. 1A shows an example of a DC/DC converter of the present invention in which boosting of four stages is performed. In FIG. 1A, potential of an input terminal of a first diode 102 is power supply potential Vdd, and an input terminal of a second diode 104 and one of terminals of a first capacitor 112 are connected to an output terminal of the first diode 102. Similarly, an input terminal of a third diode 106 and one of terminals of a second capacitor 114 are connected to an output terminal of the second diode 104. An input terminal of a fourth diode 108 and one of terminals of a third capacitor 116 are connected to an output terminal of the third diode 106. Connections of other parts are similar to the above, and therefore, detailed explanation is omitted. However, the connection can be represented as follows: one of terminals of an n-th capacitor is connected to an output terminal of an n-th diode (n: an integer). In addition, an input terminal of the n-th diode is connected to an output terminal of a (n−1)-th diode. Note that an output terminal of a fifth diode 110 is connected to one of terminals of a fifth capacitor 120, and it is an output terminal Vout of the DC/DC converter.

The other terminal of the first capacitor 112 and the other terminal of the third capacitor 116 are connected to an output terminal of a buffer circuit 122 and an input terminal of an inverter circuit 124. The other terminal of the second capacitor 114 and the other terminal of the fourth capacitor 118 are connected to an output terminal of the inverter circuit 124. In other words, it is considered that a (2k−1)-th capacitor is connected to an output terminal of the buffer circuit 122 and the input terminal of the inverter circuit 124, and a 2k-th capacitor is connected to the output terminal of the inverter circuit 124 (k: an integer). Note that as potential of the other terminal of the fifth capacitor 120, ground potential GND is inputted. A clock pulse CLK is inputted to an input terminal of the buffer circuit 122.

Figure 1B:
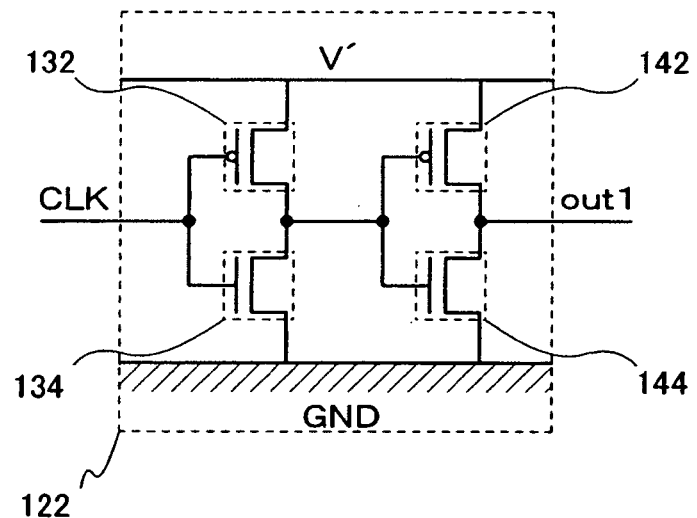
Figure 1C:
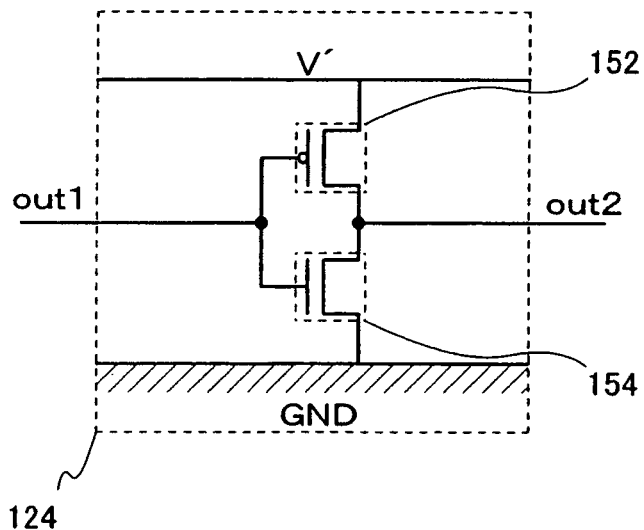

FIG. 1B shows an example of a detail of the buffer circuit 122 in FIG. 1A, and FIG. 1C shows an example of a detail of the inverter circuit 124 in FIG. 1A.

The buffer circuit 122 has a structure in which inverter circuits of two stages are connected in series. Specifically, the buffer circuit 122 includes p-channel transistors 132 and 142 and n-channel transistors 134 and 144. Here, the clock pulse CLK is inputted to a gate electrode of the p-channel transistor 132 and a gate electrode of the n-channel transistor 134. Power supply potential V' different from the power supply potential Vdd is inputted to one of a source electrode and a drain electrode of the p-channel transistor 132, and the ground potential GND is inputted to one of a source electrode and a drain electrode of the n-channel transistor 134. The other of the source electrode and the drain electrode of the p-channel transistor 132 is connected to the other of the source electrode and the drain electrode of the n-channel transistor 134, and potential is inputted to a gate electrode of the p-channel transistor 142 and a gate electrode of the n-channel transistor 144 included in the inverter circuit of the next stage.

The connection of the p-channel transistor 142 and the n-channel transistor 144 is almost the same as the connection of the p-channel transistor 132 and the n-channel transistor 134. The power supply potential V' different from the power supply potential Vdd is inputted to one of a source electrode and a drain electrode of the p-channel transistor 142, and the ground potential GND is inputted to one of a source electrode and a drain electrode of the n-channel transistor 144. The other of the source electrode and the drain electrode of the p-channel transistor 142 is connected to the other of the source electrode and the drain electrode of the n-channel transistor 144 to be an output terminal. Then, "out 1" is outputted from the output terminal.

The inverter circuit 124 includes a p-channel transistor 152 and an n-channel transistor 154. Here, the output terminal of the buffer circuit 122 is connected to a gate electrode of the p-channel transistor 152 and a gate electrode of the n-channel transistor 154. Thus, the output "out 1" of the buffer circuit 122 is inputted to the inverter circuit 124. The power supply potential V' different from the power supply potential Vdd is inputted to one of a source electrode and a drain electrode of the p-channel transistor 152, and the ground potential GND is inputted to one of a source electrode and a drain electrode of the n-channel transistor 154. The other of the source electrode and the drain electrode of the p-channel transistor 152 is connected to the other of the source electrode and the drain electrode of the n-channel transistor 154 to form an output terminal of the inverter circuit 124. Then, "out 2" is outputted from the output terminal.

What is important is that the power supply potential V' to be inputted to the buffer circuit 122 and the inverter circuit 124 is outputted from a power supply, which is different from a power supply that outputs the power supply potential Vdd. Accordingly, charge of the capacitors included in the DC/DC converter can be performed by output of the power supply, which is different from the power supply that outputs the power supply potential Vdd; therefore, the power supply potential Vdd can be stabilized. That is, another circuit using the power supply potential Vdd can be made to operate stably. Note that the above description does not intend to exclude a structure in which the power supply potential V' is equal to the power supply potential Vdd.

Hereinafter, operation of the DC/DC converter of this embodiment mode will be described. When the clock pulse CLK is High, the p-channel transistor 132 is turned OFF and the n-channel transistor 134 is turned ON in the buffer circuit 122. Accordingly, the ground potential GND, that is, Low, is inputted to the gate electrodes of the p-channel transistor 142 and the n-channel transistor 144. Thus, since the p-channel transistor 142 is turned ON and the n-channel transistor 144 is turned OFF in the buffer circuit 122, the output "out 1" of the buffer circuit 122 is the power supply potential V', that is, High. At this time, since the input terminal of the inverter circuit 124 is at High, the p-channel transistor 152 is turned OFF, and the n-channel transistor 154 is turned ON; therefore, the output "out 2" of the inverter circuit 124 is Low. On the contrary, when the clock pulse CLK is Low, the output "out 1" of the buffer circuit 122 is Low, and the output "out 2" of the inverter circuit 124 is High.

When the clock pulse CLK is High, the "out 1" of the buffer circuit 122 is High; therefore, the first capacitor 112 and the third capacitor 116 are charged by the power supply potential V', and potential of a node N1 and a node N3 is increased to the predetermined value. Accordingly, charges flow through the second diode 104 and the fourth diode 108, and potential of a node N2 and a node N4 is increased to the predetermined value. Next, when the clock pulse CLK is Low, the output "out 1" of the buffer circuit 122 is Low, and the output "out 2" of the inverter circuit 124 is High. Therefore, the second capacitor 114 and the fourth capacitor 118 are charged by the power supply potential V', and potential of the node N2 and the node N4 is further increased. Thus, potential of the node N3 and a node N5 has a further increased value. Accordingly, potential of the nodes has a relation of $V_{N5}>V_{N4}>V_{N3}>V_{N2}>V_{N1}>Vdd$, whereby boosting is performed.

Figure 2:
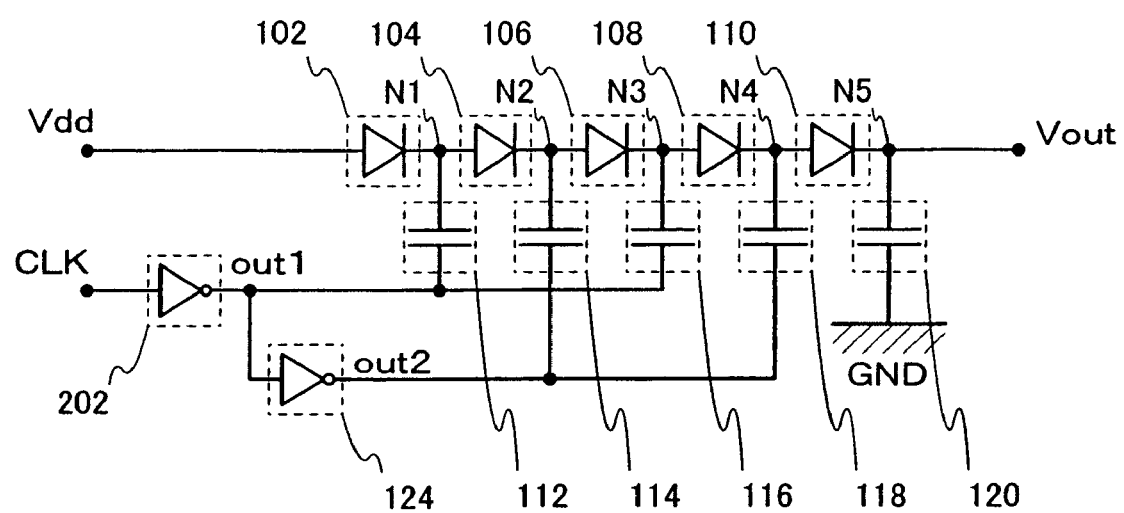
FIG. 2 is a diagram showing a structure of a DC/DC converter of the present invention.

Although the DC/DC converter in FIGS. 1A to 1C has a structure in which the buffer circuit 122 and the inverter circuit 124 are used, it is not limited thereto. For example, a structure shown in FIG. 2 may be employed. In the structure of FIG. 2, an inverter circuit 303 is provided instead of the buffer circuit 122. Since the inverter circuit is a circuit in which output is performed by inverting input, a pulse inputted to the adjacent capacitor can be inverted even when this structure is employed; therefore, the structure can serve as the DC/DC converter. Note that other elements in FIG. 2 are similar to those of FIGS. 1A to 1C, and the same references as those of FIG. 1 are used.

Although the DC/DC converters shown in FIGS. 1A to 1C and FIG. 2 each uses diodes and capacitors, a structure of a DC/DC converter is not particularly limited. For example, as a diode, an element in which one of a source electrode and a drain electrode of a transistor is connected to a gate electrode thereof may be used. As a capacitor, an element in which a source electrode and a drain electrode of a transistor are connected to have the same potential may be used. Although the DC/DC converters shown in FIGS. 1A and 2 perform boosting of four stages, they are not limited thereto. The number of stages is preferably changed as appropriate depending on the degree of the required boosting.

The DC/DC converter of this embodiment mode has a structure in which the power supply potential Vdd is not used for charging a capacitor. Accordingly, fluctuation of the power supply potential Vdd caused by operation of the DC/DC converter can be suppressed. Thus, power supplied to other circuits can be stabilized, and operation defects in another circuit can be reduced.

Note that the DC/DC converter shown in this embodiment mode is just an example, and the structure thereof is not limited to this embodiment mode.

Embodiment Mode 2

Figure 3:
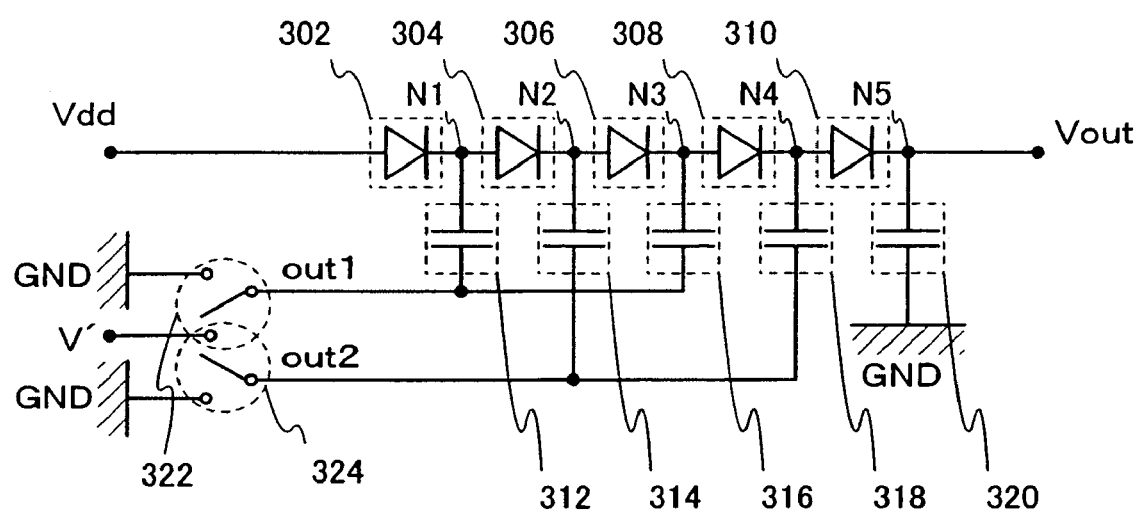
FIG. 3 is a diagram showing a structure of a DC/DC converter of the present invention.

This embodiment mode will describe a variation of the DC/DC converter shown in Embodiment Mode 1 with reference to FIG. 3.

FIG. 3 shows another example of a DC/DC converter of the present invention in which boosting of four stages is performed. In FIG. 3, potential of an input terminal of a first diode 302 is power supply potential Vdd, and an input terminal of a second diode 304 and one of terminals of a first capacitor 312 are connected to an output terminal of the first diode 302. Similarly, an input terminal of a third diode 306 and one of terminals of a second capacitor 314 are connected to an output of the second diode 304. Connections of other parts are similar to the above, and therefore, detailed explanation is omitted. However, the connection can be represented as follows: one of terminals of an n-th capacitor is connected to an output of an n-th diode (n: an integer). Further, an input terminal of the n-th diode is connected to an output terminal is an (n−1)-th diode. Note that an output terminal of a fifth diode 310 is connected to one of terminals of a fifth capacitor 320, and it is an output terminal Vout of the DC/DC converter.

The other terminal of the first capacitor 312 and the other terminal of a third capacitor 316 are connected to a first switch element 322. The other terminal of the second capacitor 314 and the other terminal of a fourth capacitor 318 are connected to a second switch element 324. In other words, it can be considered that a (2k−1)-th capacitor is connected to the first switch element 322, and a 2k-th capacitor is connected to the second switch element 324 (k: an integer). However, as potential of the other terminal of the fifth capacitor 320, ground potential GND is inputted thereto.

In the DC/DC converter of this embodiment mode, general switch elements are provided instead of the buffer circuit and the inverter circuit, which is different point from the DC/DC converter in Embodiment Mode 1. Here, the first switch 322 and the second switch 324 are elements for selecting the power supply potential V' or the ground potential GND.

Hereinafter, operation of the DC/DC converter of this embodiment mode will be described. First, the switch element 322 and the second switch element 324 are set so that one of the first switch element 322 and the second switch element 324 selects the power supply potential V' and the other one selects the ground potential GND. For example, the case in considered, in which the first switch element 322 selects the power supply potential V' and the second switch element 324 selects the ground potential GND. At this time, the first capacitor 312 and the third capacitor 316 are charged by the power supply potential V', and potential of a node N1 and a node N3 is increased to the predetermined value. Accordingly, charges flow through the second diode 304 and a fourth diode 308, and potential of a node N2 and a node N4 is increased to the predetermined value.

Next, the first switch element and the second element are switched so that one of the first switch element 322 and the second switch element 324 selects the ground potential GND and the other one selects the power supply potential V'. In other words, the first switch element 322 selects the ground potential GND, and the second switch element 324 selects the power supply potential V'. At this time, the second capacitor 114 and the fourth capacitor 118 are charged by the power supply potential V', and potential of the node N2 and node N4 is further increased. Thus, potential of the node N3 and a node N5 has further increased value. Accordingly, potential of the nodes has a relation of $V_{N5} > V_{N4} > V_{N3} > V_{N2} > V_{N1} > V_{dd}$, whereby boosting is performed.

Note that the switching of the switch elements is needed to be performed before each capacitor is completely discharged. In the case where each capacitor is completely discharged, the effect of increasing potential of each node cannot be obtained.

The DC/DC converter shown in this embodiment mode has a structure in which the power supply potential Vdd is not used for charging the capacitor. Accordingly, fluctuation of the power supply potential Vdd caused by operation of the DC/DC converter can be suppressed. Therefore, power supplied to another circuit can be stabilized, and operation defects in another circuit can be reduced. The effect of the present invention can be obtained by supplying potential for charging the capacitor in the DC/DC converter from a circuit, which is different from a circuit supplying potential to another circuit. Accordingly, the structure of the DC/DC converter is not particularly limited, and a structure in which the buffer circuit and the inverter circuit are not used may be employed as in this embodiment mode. The structure of the switch element can be changed as appropriate. Further, although the DC/DC converter shown in FIG. 3 perform boosting of four stages, the present invention is not particularly limited thereto. The number of stages is preferably changed as appropriate depending on the degree of the required boosting.

Note that the DC/DC converter shown in this embodiment mode is just an example, and the structure thereof is not limited to that in this embodiment mode.

Embodiment Mode 3

This embodiment mode will describe a semiconductor device in which a DC/DC converter of the present invention is used with reference to FIGS. 4A to 5B.

Figure 4A:
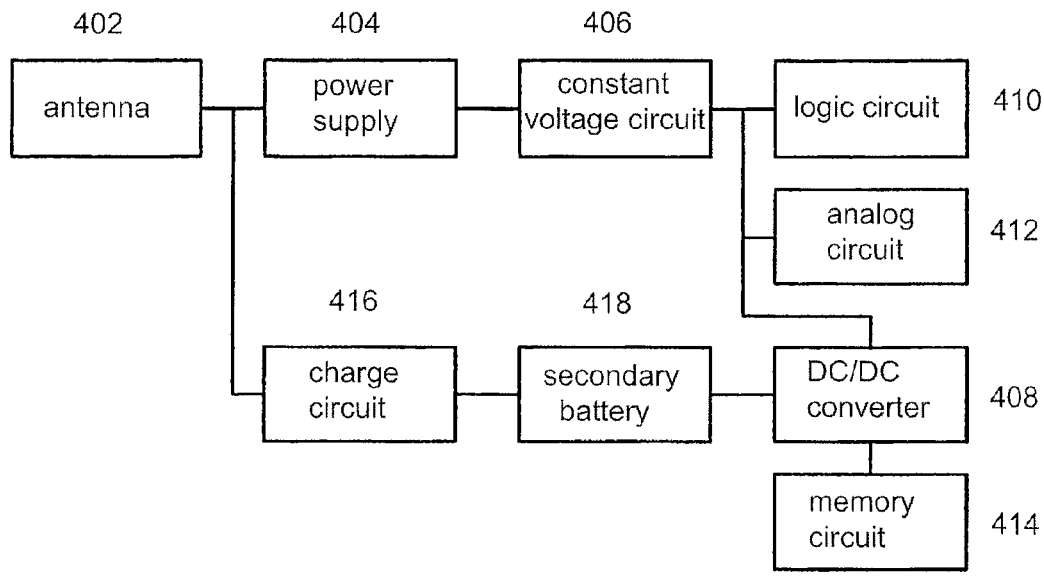
FIGS. 4A to 4C are views showing structures of a semiconductor device of the present invention.

FIG. 4A is an example of a structure of a semiconductor device in which a DC/DC converter of the present invention is used. An antenna 402 is connected to an input terminal of a power supply circuit 404 and an input terminal of a charge circuit 416. An output terminal of the power supply circuit 404 is connected to an input terminal of a constant voltage circuit 406, and an output terminal of the constant voltage circuit 406 is connected to an input terminal of a DC/DC converter 408, a logic circuit 410, and an analog circuit 412. An output terminal of the charge circuit 416 is connected to an input terminal of a secondary battery 418. An output terminal of the secondary battery 418 is connected to the input terminal of the DC/DC converter 408, and an output terminal of the DC/DC converter 408 is connected to a memory circuit 414. Here, the DC/DC converter 408 has a structure in which voltage from the output terminal of the constant voltage circuit 406 is boosted by power supplied from the secondary battery.

Figure 4B:
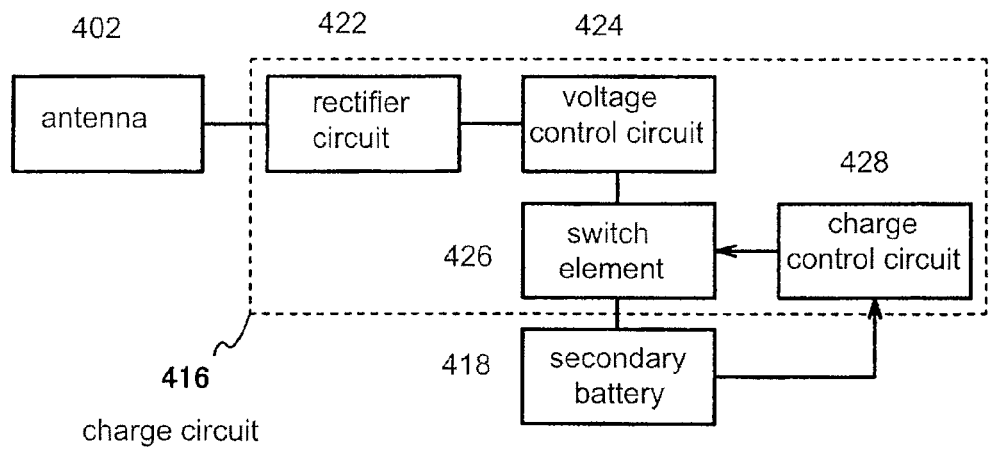
Figure 4C:
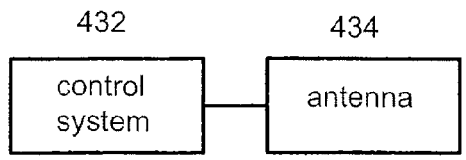

Note that the structure shown in FIGS. 4A to 4C is a schematic view for clarifying flow of power, and there are a plurality of connection relations other than the connection relation shown in FIGS. 4A to 4C. For example, a wiring for communication of data is connected between the memory circuit and the logic circuit or the analog circuit. A clock pulse generated based on a signal from the antenna is supplied to the DC/DC converter 408.

Here, a structure in which the secondary battery is charged using the charge circuit will be described in detail.

As shown in FIG. 4B, the charge circuit 416 described in this embodiment mode includes a rectifier circuit 422, a voltage control circuit 424, a switch element A 426, and a charge control circuit 428. The antenna 402 is connected to an input terminal of the rectifier circuit 422, and an output terminal of the rectifier circuit 422 is connected to an input terminal of the voltage control circuit 424. An output terminal of the voltage control circuit 424 is connected to the secondary battery 418 through the switch element A 426. The charge control circuit 428 is connected to the secondary battery 418 to monitor the charging state of the secondary battery and control ON/OFF of the switch element A 426 depending on the charging state.

When a diode is used as the switch element A 426, the charge control circuit 428 can be omitted. The voltage control circuit 424 may be a control circuit of voltage and current.

Next, an example of a reader/writer performing communication with the semiconductor device and capable of charging the secondary battery is shown in FIG. 4C. The reader/writer includes a control system 432 and an antenna 434.

Figure 5A:
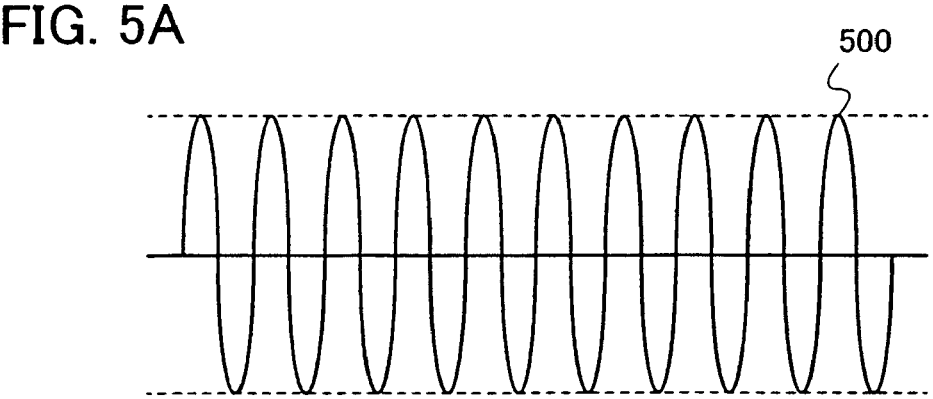
FIGS. 5A and 5B are views showing a method for charging a secondary battery of the present invention.
Figure 5B:
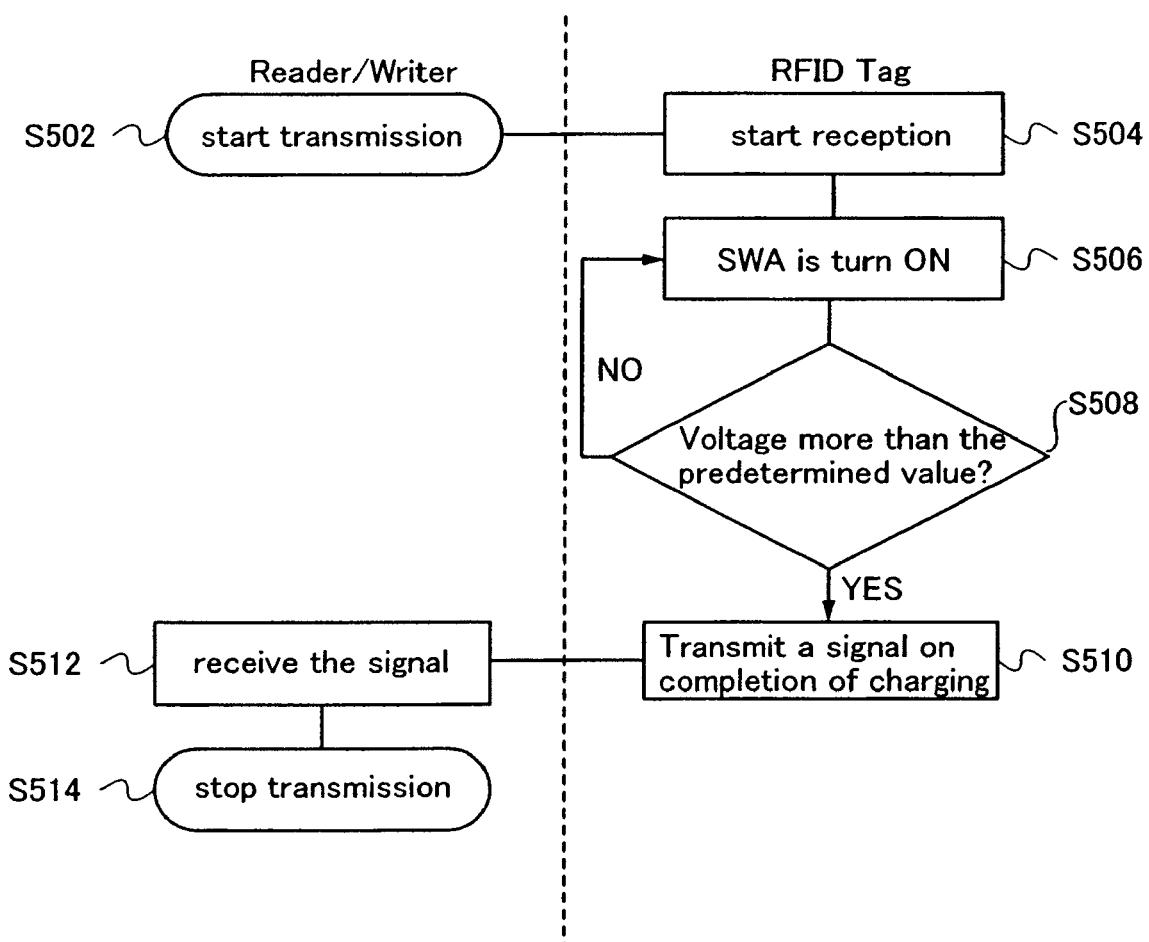

As the simplest example of charging the secondary battery of the semiconductor device by the reader/writer, communication using an electromagnetic wave 500 with constant amplitudes as shown in FIG. 5A is given. The charging method at this time is shown in a flow chart of FIG. 5B.

First, as a step S502, transmission of an electromagnetic wave with constant amplitudes from an antenna of a battery charger is started. When an RFID tag receives the electromagnetic wave as a step S504, a switch A (SWA) is turned ON and charging of the secondary battery is started as a step S506. At this time, the charge control circuit monitors a charging state of the secondary battery in a step S508. When voltage of the secondary battery becomes the predetermined value or more (YES), the RFID tag transmits a signal on completion of charging as a step S510. The reader/writer receives the signal in a step S512 and stops transmission of the electromagnetic wave in a step S514. When the voltage of the secondary battery does not reach the predetermined value (NO), the process is returned to the step S506, and the charging is continuously performed.

In the structure shown in this embodiment mode, it is not preferable that charging of the secondary battery be performed at the timing of operation of the logic circuit and the like. This is because power supplied to the logic circuit and the like tends to be unstable by charging the secondary battery.

By manufacturing the semiconductor device using the DC/DC converter of the present invention, power supplied from an antenna can be stabilized. In particular, when a nonvolatile memory that needs high voltage in writing data is used, the effect of stability is significant, and operation defects in another circuit can be drastically reduced. In addition, a response output to the external of the semiconductor device can be prevented from reduction. That is, a communication distance can be increased. Further, a large amount of power can be used in comparison with the case of using power supplied from the antenna; therefore, the boosting capability of the DC/DC converter can be improved.

Further, power supply potential of the secondary battery is reduced only slightly, and the capacitor included in the DC/DC converter can be charged at high speed; therefore, the boosting time period can be shortened. By supplying power to the DC/DC converter using a circuit, which is different from a circuit supplying power to another circuit, conditions of power needed for another circuit can be eased, and therefore, a size of another circuit can be enlarged. Furthermore, a noise caused by a power supply can be reduced. By using a secondary battery that can be charged wirelessly, complicate charge operation is unnecessary. In addition, the battery is just slightly deteriorated with time in comparison with the case of using a primary battery, and exchange of the battery is unnecessary.

Although the structure in which the charge circuit 416 is connected to the antenna 402 is shown in this embodiment mode, the structure is just an example, and the present invention is not limited to this embodiment mode. For example, a structure in which the charge circuit is connected to the antenna through the power supply circuit or the constant voltage circuit may be employed. In this case, the structure of the charge circuit is preferably changed as appropriate. A circuit which controls an output of the secondary battery which is inputted to the DC/DC converter may be provided. By using the circuit, the output voltage of the DC/DC converter can be controlled without changing a circuit structure. The destination of power supply of the DC/DC converter is not limited to the memory circuit, and the power may be supplied to another circuit.

Although the semiconductor device of this embodiment mode has the structure in which power is supplied to the logic circuit, the analog circuit, and the like through the power supply circuit and the constant voltage circuit, the structure is not limited thereto. For example, a structure may be employed, in which a charge circuit and a secondary battery are used instead of the power supply circuit 404 and the constant voltage circuit 406. By employing such a structure, the logic circuit and the analog circuit can be made to operate by power supplied from the secondary battery; therefore, operation can be stabilized in comparison with the case in which the secondary battery is not used. The power supply circuit 404 and the constant voltage circuit 406 are exchanged for the charge circuit and the secondary battery similarly to the case where the potential Vdd of the DC/DC converter shown in Embodiment Modes 1 and 2 is exchanged for potential V" of the secondary battery. Naturally, this does not prevent the result of V"=Vdd or V"=V'.

All the power supplied to the DC/DC converter can be supplied from the secondary battery 418. This is similar to that the potential Vdd of the DC/DC converter is exchanged for the potential V' shown in Embodiment Modes 1 and 2. When such a structure is employed, a plurality of charge circuits and secondary batteries are not necessarily provided, and therefore, the circuit configuration can be simplified. This embodiment mode can be combined with Embodiment Mode 1 or 2 as appropriate.

Embodiment Mode 4

Figure 6A:
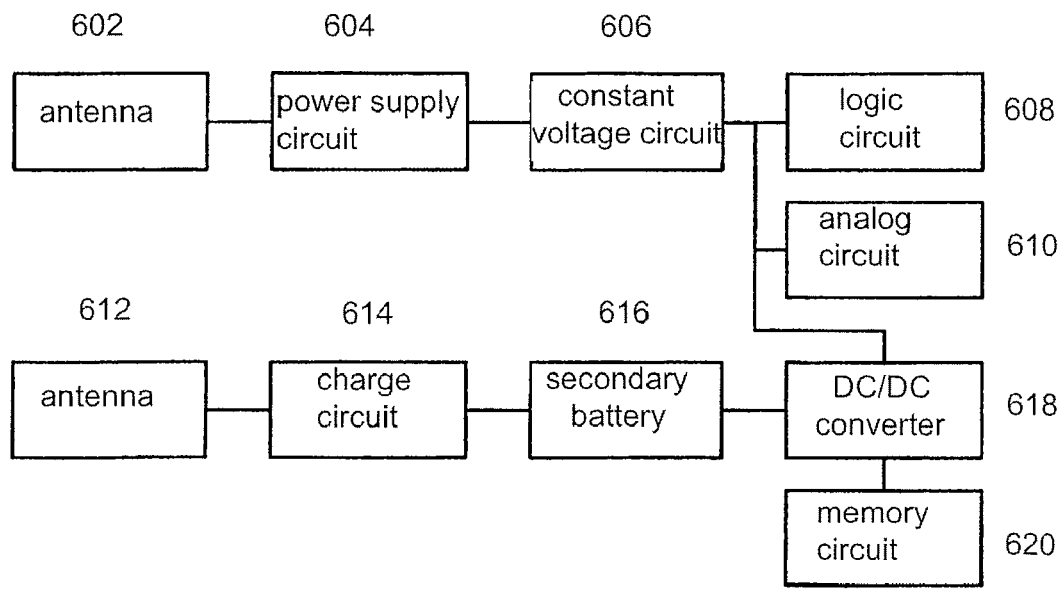
FIGS. 6A and 6B are views each showing a structure of a semiconductor device of the present invention.
Figure 6B:
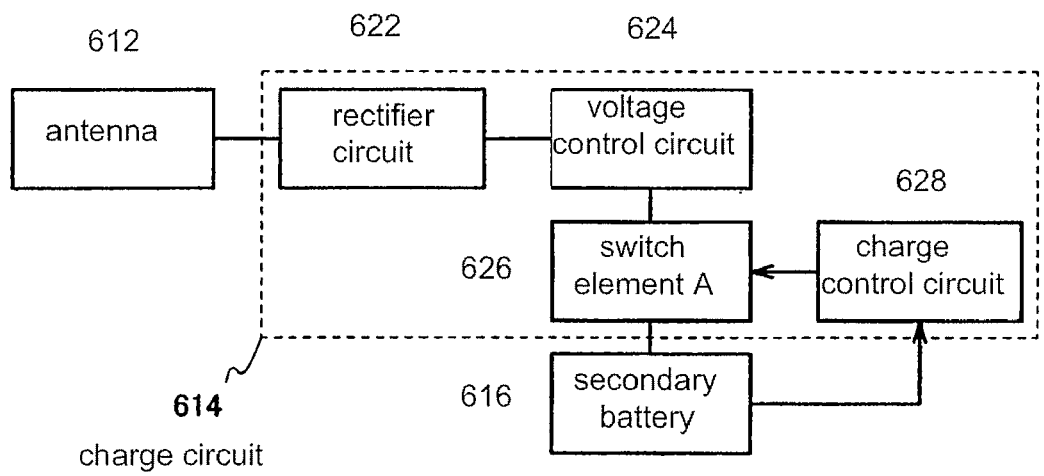

This embodiment mode will describe another example of a semiconductor device in which a DC/DC converter of the present invention is used with reference to FIGS. 6A and 6B.

FIGS. 6A and 6B show another example of a structure of a semiconductor device in which a DC/DC converter of the present invention is used. An antenna 602 is connected to an input terminal of a power supply circuit 604. An output terminal of the power supply circuit 604 is connected to an input terminal of a constant voltage circuit 606. An output terminal of a constant voltage circuit 606 is connected to an input terminal of a DC/DC converter 618, a logic circuit 608, and an analog circuit 610. Furthermore, an antenna 612 different from the antenna 602 is connected to an input terminal of a charge circuit 614. An output terminal of the charge circuit 614 is connected to an input terminal of a secondary battery 616, an output terminal of the secondary battery 616 is connected to an input terminal of a DC/DC converter 618, and an output terminal of the DC/DC converter 618 is connected to a memory circuit 620. Here, the DC/DC converter 618 has a structure in which voltage from the output terminal of the constant voltage circuit 606 is boosted by power supplied from the secondary battery 616.

The structure shown in FIG. 6A is a schematic view for clarifying flow of power, and there are a plurality of connection relations other than the connection relation shown in FIG. 6A. For example, a wiring for communication of data is connected between the memory circuit and the logic circuit or the analog circuit. A clock pulse generated based on a signal from the antenna is supplied to the DC/DC converter 618.

The antenna 612 that generates power used for boosting is provided separately from the antenna 602 that supplies power to the logic circuit and the like, which is a different point between the semiconductor device of this embodiment mode and the semiconductor device of Embodiment Mode 3.

Next, a structure of this embodiment mode in which the secondary battery is charged using the charge circuit will be described.

As shown in FIG. 6B, the charge circuit 614 described in this embodiment mode includes a rectifier circuit 622, a voltage control circuit 624, a switch element A 626, and a charge control circuit 628. The antenna 612 is connected to an input terminal of the rectifier circuit 622, and an output terminal of the rectifier circuit 622 is connected to an input terminal of the voltage control circuit 624. An output terminal of the voltage control circuit 624 is connected to the secondary battery 616 through the switch element A 626. The charge control circuit 628 is connected to the secondary battery 616 to monitor the charging state of the secondary battery 616 and control ON/OFF of the switch element A 626 depending on the charging state.

When a diode is used as the switch element A 626, the charge control circuit 628 can be omitted. Further, the voltage control circuit 624 may be a control circuit of voltage and current.

As an example in which the secondary battery of the semiconductor device is charged by the reader/writer, a method described in Embodiment Mode 3 can be used as appropriate, and therefore, the description is omitted here.

By manufacturing a semiconductor device using the DC/DC converter of the present invention, power supplied from the antenna can be stabilized. Accordingly, operation defects in another circuit can be reduced. In addition, a response output to the external of the semiconductor device can be prevented from reduction. In other words, a communication distance can be increased. Further, a large amount of power can be used in comparison with the case of using power supplied from the antenna; therefore, the boosting capability of the DC/DC converter can be improved. By providing an antenna for supplying power for boosting as described in this Embodiment Mode, which is different from the antenna for supplying power to another circuit, the secondary battery can be constantly charged regardless of operation of the logic circuit and the like. Thus, the effect of charging can be improved.

Further, power supply potential of the secondary battery is reduced only slightly, and the capacitor included in the DC/DC converter can be charged at high speed; therefore, boosting time period can be shortened. By supplying power to the DC/DC converter from a circuit which is different from a circuit supplying power to another circuit, conditions of power needed for another circuit can be eased, and therefore, a size of another circuit can be enlarged. Furthermore, a noise caused by a power supply can be reduced. By using a secondary battery that can be charged wirelessly, complicate charge operation is unnecessary. In addition, the battery is just slightly deteriorated with time in comparison with the case of using the primary battery, and exchange of the battery is unnecessary.

The structure shown in this embodiment mode is just an example, and the present invention is not limited to this embodiment mode. This embodiment mode can be combined with Embodiment Modes 1 to 3 as appropriate.

Embodiment Mode 5

Figure 7A:
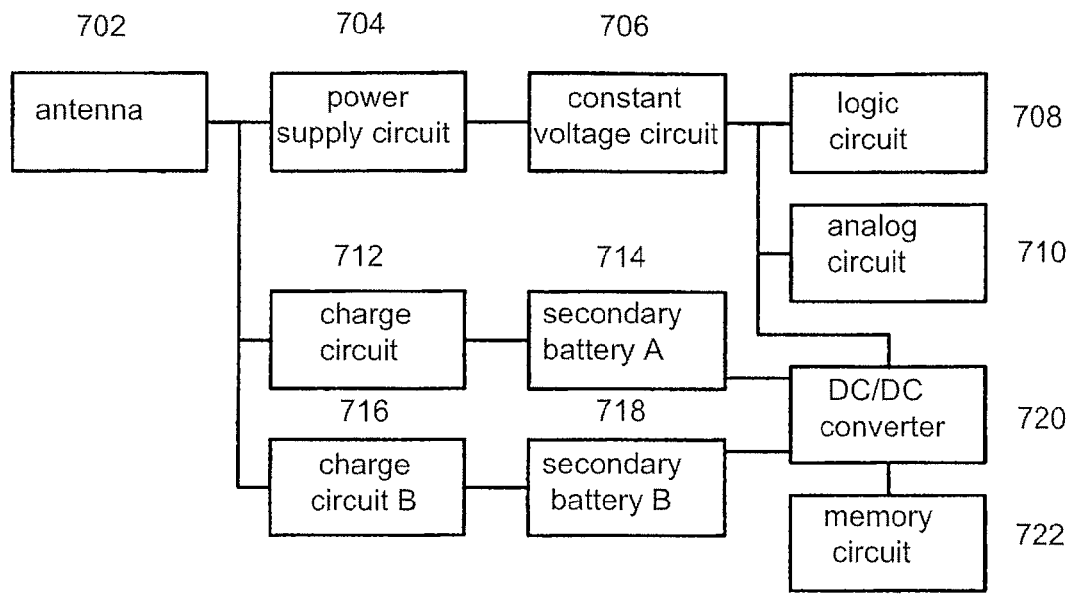
FIGS. 7A and 7B are views each showing a structure of a semiconductor device of the present invention.
Figure 7B:
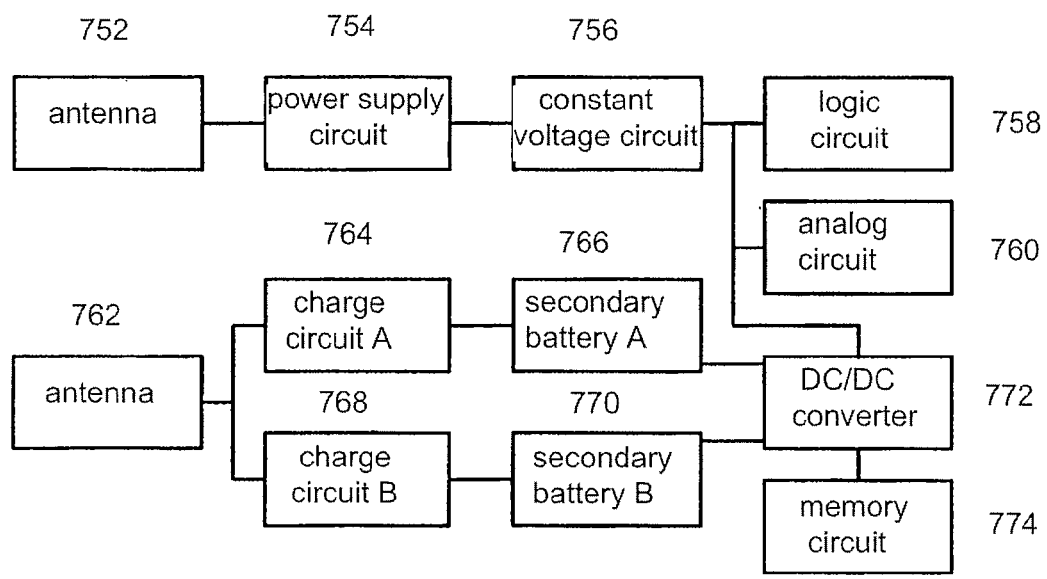

This embodiment mode will describe another example of a semiconductor device in which a DC/DC converter of the present invention is used with reference to FIGS. 7A and 7B.

FIG. 7A shows another example of a structure of a semiconductor device in which a DC/DC converter of the present invention is used. In FIG. 7A, an antenna 702 is connected to an input terminal of a power supply circuit 704, an input terminal of a charge circuit A 712, and an input terminal of a charge circuit B 716. An output terminal of the power supply circuit 704 is connected to an input terminal of a constant voltage circuit 706, and an output terminal of the constant voltage circuit 706 is connected to an input terminal of a DC/DC converter 720, a logic circuit 798, and an analog circuit 710. Further, an output terminal of the charge circuit A 712 is connected to an input terminal of a secondary battery A 714, and an output of the charge circuit B 716 is connected to an input terminal of a secondary battery B 718. An output terminal of the secondary battery A 714 and the secondary battery B 718 are connected to the input terminal of the DC/DC converter 720, and an output terminal of the DC/DC converter 720 is connected to a memory circuit 722. Here, the DC/DC converter 720 has a structure in which voltage from the output terminal of the constant voltage circuit 706 is boosted by power supplied from the secondary battery A 714 and the secondary battery B 718.

The structure shown in FIG. 7A is a schematic view for clarifying flow of power, and there are a plurality of connection relations other than the connection relation shown in FIG. 7A. For example, a wiring for performing communication of data is connected between the memory circuit and the logic circuit or the analog circuit. A clock pulse generated based on a signal from the antenna is supplied to the DC/DC converter 720.

The antenna 702 that generates power used for boosting is connected to two charge circuits, and each of the charge circuits charges the corresponding secondary battery, which is a different point between the semiconductor device shown in FIG. 7A and the semiconductor device of Embodiment Mode 3. By using the structure, for example, power of two secondary batteries can be supplied to a buffer circuit and an inverter circuit in a DC/DC converter, respectively.

FIG. 7B shows still another example of a structure of a semiconductor device in which a DC/DC converter of the present invention is used. An antenna 752 is connected to an input terminal of a power supply circuit 754. An output terminal of the power supply circuit 754 is connected to an input terminal of a constant voltage circuit 756, and an output terminal of the constant voltage circuit 756 is connected to an input terminal of a DC/DC converter 772, a logic circuit 758, and an analog circuit 760. An antenna 762 different from the antenna 752 is connected to an input terminal of a charge circuit A 764 and an input terminal of a charge circuit B 768. An output terminal of the charge circuit A 764 is connected to an input terminal of a secondary battery A 766, and an output terminal of the charge circuit B 768 is connected to an input terminal of a secondary battery B 770. An output terminal of the secondary battery A 766 and the secondary battery B 770 are connected to an input terminal of the DC/DC converter 772, and an output terminal of the DC/DC converter 772 is connected to a memory circuit 774. Here, the DC/DC converter 772 has a structure in which voltage from the output terminal of the constant voltage circuit 756 is boosted by power supplied from the secondary battery A 766 and the secondary battery B 770.

The structure shown in FIG. 7B is a schematic view for clarifying flow of power, and there are a plurality of connection relations other than the connection relation shown in FIG. 7B. For example, a wiring for performing communication of data is connected between the memory circuit and the logic circuit or the analog circuit. A clock pulse generated based on a signal from the antenna is supplied to the DC/DC converter 772.

The antenna 762 that generates power used for boosting is provided separately from the antenna 752 that supplies power to the logic circuit and the like, which is a different point between the semiconductor device shown in FIG. 7B and the semiconductor device shown in Embodiment Mode 3. The antenna 762 that generates power used for boosting is connected to two charge circuits, and each of the two charge circuits charges the corresponding secondary battery, which is also a different point. By using such a structure, for example, power of the two secondary batteries is supplied to a buffer circuit and an inverter circuit in the DC/DC converter, respectively.

As the specific structure of the charge circuit, the structure shown in Embodiment Mode 3 or 4 can be used as appropriate; therefore, the explanation is omitted here. As an example of charging the secondary battery of the semiconductor device by the reader/writer, a method described in Embodiment Mode 3 or the like can be used as appropriate.

In the case of manufacturing the semiconductor device using the structure shown in this embodiment mode, power supplied from the antenna can be stabilized. Accordingly, operation defects in another circuit can be reduced. In addition, a response output to the external of the semiconductor device can be prevented from reduction. In other words, a communication distance can be increased. A large amount of power can be used in comparison with the case of using power supplied from the antenna; therefore, the boosting capability of the DC/DC converter can be improved. This is preferable from the view of stability of power and the like because loads to each of the two secondary batteries can be reduced. Further, power supply potential of the secondary batteries is reduced only slightly, and the capacitor included in the DC/DC converter can be charged at high speed; therefore, boosting time period can be shortened.

In the case of manufacturing the semiconductor device using the structure of FIG. 7B, an antenna for supplying power for boosting can be provided, which is different from an antenna for supplying power to another circuit. Accordingly, the secondary batteries can be constantly charged regardless of operation of the logic circuit and the like. Thus, the effect of the charge can be improved. By supplying power to the DC/DC converter from a circuit which is different from a circuit supplying power to another circuit, conditions of power needed for another circuit can be eased, and therefore, a size of another circuit can be enlarged. Furthermore, a noise caused by a power supply can be reduced. By using a secondary battery that can be charged wirelessly, complicate charge operation is unnecessary. In addition, the battery is just slightly deteriorated with time in comparison with the case of using the primary battery, and exchange of the battery is unnecessary.

The structure shown in this embodiment mode is just an example, and the present invention is not particularly limited to this embodiment mode. For example, in FIG. 7A, the charge circuit A and the charge circuit B may be connected to the antenna through the power supply circuit or the constant voltage circuit. In this case, each structure of the charge circuit A and the charge circuit B is preferably changed as appropriate. Further, one charge circuit may be provided, which has functions of the charge circuit A and the charge circuit B. This embodiment mode can be combined with Embodiment Modes 1 to 4 as appropriate.

Embodiment Mode 6

This embodiment mode will describe an example of a method for manufacturing a semiconductor device shown in the above embodiment modes with reference to FIGS. 8A to 12B.

First, a peeling layer 803 is formed over a substrate 801 with an insulating film 802 interposed therebetween, and an insulating film 804 serving as a base film and a semiconductor film 805 (for example, a film containing amorphous silicon) are stacked thereover (see FIG. 8A). Note that the insulating film 802, the peeling layer 803, the insulating film 804, and a semiconductor film 805 can be successively formed.

The substrate 801 is selected from a glass substrate, a quartz substrate, a ceramic substrate, a metal substrate (e.g., a stainless steel substrate), a Si substrate, or the like. Alternatively, a plastic substrate made of polyethylene terephthalate (PET), polyethylene naphthalate (PEN), polyether sulfone (PES), acrylic, or the like can be used. In this process, although the peeling layer 803 is provided over the entire surface of the substrate 801 with the insulating film 802 interposed therebetween, the peeling layer 803 may also be selectively formed by forming masks by a photolithography method and performing etching.

The insulating films 802 and 804 can be formed using insulating materials such as silicon oxide, silicon nitride, silicon oxynitride ($SiO_xN_y$: x>y>0), or silicon nitride oxide ($SiN_xO_y$: x>y>0) by a CVD method, a sputtering method, or the like. For example, when each of the insulating films 802 and 804 is formed to have a two-layer structure, a silicon nitride oxide film may be formed as a first insulating film and a silicon oxynitride film may be formed as a second insulating film. In addition, a silicon nitride film may be formed as a first insulating film and a silicon oxide film may be formed as a second insulating film. Naturally, each of the insulating films 802 and the insulating film 804 may have a single-layer structure, or a stacked structure formed of three layers or more. The insulating film 802 functions as a blocking layer which prevents an impurity element contained in the substrate 801 from getting mixed into the peeling layer 803 or elements formed thereover. The insulating film 804 functions as a blocking layer which prevents an impurity element contained in the substrate 801 or the peeling layer 803 from getting mixed into elements formed over the insulating film 804. In this manner, by providing the insulating films 802 and 804 which function as the blocking layers, adverse effects on the element can be prevented from entering an alkali metal such as Na or an alkaline earth metal contained in the substrate 801. Also, adverse effects on the element can be prevented from entering the impurity element contained in the peeling layer 803. Note that when quartz that can ignore affect by the impurity element is used for the substrate 801, the insulating films 802 and 804 may be omitted.

A metal film, a stacked-layer of a metal film and a metal oxide film, and the like can be used for the peeling layer 803. As a material of the above metal film, an element selected from tungsten (W), molybdenum (Mo), titanium (Ti), tantalum (Ta), niobium (Nb), nickel (Ni), cobalt (Co), zirconium (Zr), zinc (Zn), ruthenium (Ru), rhodium (Rh), palladium (Pd), osmium (Os), and iridium (Ir), or an alloy material or a compound material containing the element as its main component can be given. A metal film having a single layer structure of a stacked structure can be formed using the material. As a method for forming a metal film, a sputtering method, various CVD methods such as a plasma CVD method, or the like can be used. A stacked structure of a metal film and a metal oxide film can be obtained by the steps of forming the above-described metal film, applying plasma treatment thereto under an oxygen atmosphere or an $N_2O$ atmosphere or applying heat treatment thereto under an oxygen atmosphere or an $N_2O$ atmosphere, and thereby forming oxide or oxynitride of the metal film on the surface of the metal film. For example, when a tungsten film is provided as a metal film by a sputtering method, a CVD method, or the like, a metal oxide film of tungsten oxide can be formed on the surface of the tungsten film by application of plasma treatment to the tungsten film in the oxidative atmosphere. In that case, the tungsten oxide can be represented by $WO_x$ where x is in the range of 2 to 3. For example, there are cases where x is 2 ($WO_2$), x is 2.5 ($W_2O_5$), x is 2.75 ($W_4O_{11}$), x is 3 ($WO_3$), and the like. When tungsten oxide is formed, there is no particular limitation on the value of x, and thus, the tungsten oxide to be formed may be determined based on the etching rate or the like.

The semiconductor film 805 is formed with a thickness of greater than or equal to 25 nm and less than or equal to 200 nm (preferably, greater than or equal to 30 nm and less than or equal to 150 nm) by a sputtering method, an LPCVD method, a plasma CVD method, or the like. A material of the semiconductor film 805 is not limited, but silicon or silicon germanium is preferably used.

Next, the semiconductor film 805 is crystallized by laser irradiation. Alternatively, the crystallization of the semiconductor film 805 may be performed by a method combining the laser irradiation with a thermal crystallization method using RTA or an annealing furnace or with a thermal crystallization method using a metal element that promotes the crystallization. After that, the crystallized semiconductor film is etched into a desired shape, whereby crystalline semiconductor films 805a to 805f are formed. Then, a gate insulating film 806 is formed so as to cover the semiconductor films 805a to 805f (see FIG. 8B).

As a laser beam used for crystallization, either a continuous wave laser (a CW laser) or a pulsed laser can be used. As a laser that can be used for example, there are gas lasers such as an Ar laser, a Kr laser, and an excimer laser; a laser whose medium is single-crystalline YAG, $YVO_4$, forsterite ($Mg_2SiO_4$), $YAlO_3$, or $GdVO_4$ or polycrystalline (ceramic) YAG, $Y_2O_3$, $YVO_4$, $YAlO_3$, or $GdVO_4$ doped with one or more of Nd, Yb, Cr, Ti, Ho, Er, Tm, and Ta as a dopant; a glass laser; a ruby laser; an alexandrite laser; a Ti:sapphire laser; a copper vapor laser; and a gold vapor laser. When irradiation is performed with the fundamental wave of such a laser beam or the second to fourth harmonics of the fundamental harmonic, crystals with a large grain size can be obtained. For example, the second harmonic (532 nm) or the third harmonic (355 nm) of an Nd:$YVO_4$ laser (the fundamental harmonic of 1064 nm) can be used. The Nd:$YVO_4$ laser can be emitted by continuous wave or pulsed wave.

Note that the laser whose medium is single crystal YAG, $YVO_4$, forsterite ($Mg_2SiO_4$), $YAlO_3$, or $GdVO_4$ or polycrystalline (ceramic) YAG, $Y_2O_3$, $YVO_4$, $YAlO_3$, or $GdVO_4$ doped with one or more of Nd, Yb, Cr, Ti, Ho, Er, Tm, and Ta as a dopant; an Ar ion laser, or a Ti:sapphire laser can be used as a CW laser, whereas it can also be used as a pulsed laser with a repetition rate of 10 MHz or more by a Q-switch operation, mode locking, or the like. When a laser beam with a repetition rate of 10 MHz or more is used, a semiconductor film is irradiated with the next pulse during the period in which the semiconductor film has been melted by the laser beam and is solidified. Therefore, unlike the case of using a pulsed laser with a low repetition rate, a solid-liquid interface in the semiconductor film can be continuously moved. Thus, crystal grains which have grown successively in the scanning direction can be obtained. When a transistor is formed by adjusting a channel length direction (direction to which carries flow) with the scanning direction, a thin film transistor (TFT) with high electron field-effect mobility can be obtained.

The gate insulating film 806 can be formed using an insulating material such as silicon oxide, silicon nitride, silicon oxynitride ($SiO_xN_y$: x>y>0), or silicon nitride oxide ($SiN_xO_y$: x>y>0) by a CVD method, a sputtering method, or the like. For example, when the gate insulating film 806 is formed to have a two-layer structure, it is preferable to form a silicon oxynitride film as a first insulating film and form a silicon nitride oxide film as a second insulating film. Alternatively, it is also preferable to form a silicon oxide film as a first insulating film and form a silicon nitride film as a second insulating film. Naturally, the gate insulating film 806 may be a single layer structure or a stacked structure.

As another method, high-density plasma treatment is performed to the semiconductor films 805a to 805f, and surfaces thereof are oxidized or nitrided, whereby the gate insulating film 806 may be formed. Accordingly, an insulating film with a thickness of greater than or equal to 1 nm and less than or equal to 20 nm, typically, greater than or equal to 5 nm and less than or equal to 10 nm, is formed over the semiconductor film. The reaction of this case is the solid phase reaction; therefore, the interface state density between the insulating film and the semiconductor film can be suppressed to be extremely low. Since the semiconductor film is directly oxidized (or nitrided) by the high-density plasma treatment, unevenness of thickness of the insulating film to be formed can be extremely small.

Next, a first conductive film and a second conductive film are stacked over the gate insulating film 806 (not shown). Here, the first conductive film is formed to have a thickness of greater than or equal to 20 nm and less than or equal to 100 nm by a CVD method, a sputtering method, or the like. The second conductive film is formed to have a thickness of greater than or equal to 100 and less than or equal to 400 nm. The first conductive film and the second conductive film are formed of an element selected from tantalum (Ta), tungsten (W), titanium (Ti), molybdenum (Mo), aluminum (Al), gold (Au), silver (Ag), copper (Cu), platinum (Pt), copper (Cu), chromium (Cr), niobium (Nb), or the like, or an alloy material or a compound material containing such an element as its main component. Alternatively, the first conductive film and the second conductive film are formed of semiconductor materials typified by polycrystalline silicon doped with an impurity element such as phosphorus. As a combination example of the first conductive film and the second conductive film, a tantalum nitride film and a tungsten film; a tungsten nitride film and a tungsten film; a molybdenum nitride film and a molybdenum film; and the like can be given. Tungsten and tantalum nitride have high heat resistance. Therefore, after forming the first conductive film and the second conductive film, thermal treatment for the purpose of heat activation can be applied thereto. In addition to two-layer structure, a single layer structure or a stacked structure of three layers or more may be used. For example, in the three-layer structure, a stacked structure of a molybdenum film, an aluminum film, and a molybdenum film may be employed.

Next, a mask made of resist is formed using a photolithography method, and the first conductive film and the second conductive film are etched, whereby gate electrodes 807 are formed above the semiconductor films 805a to 805f.

Next, as shown in FIG. 8C, an n-type impurity element is added to the semiconductor films 805a to 805f at low concentration, using the gate electrodes 807 as masks by an ion doping method or an ion implantation method. Then, a resist mask is selectively formed by photolithography, and a p-type impurity element is added at high concentration. As an n-type impurity element, phosphorus (P), arsenic (As), or the like can be used. As a p-type impurity element, boron (B), aluminum (Al), gallium (Ga), or the like can be used. Here, phosphorus (P) is used as an n-type impurity element and is selectively introduced into the semiconductor films 805a to 805f so as to be contained at concentrations of greater than or equal to $1\times10^{15}/cm^3$ and less than or equal to $1\times10^{19}/cm^3$. Thus, n-type impurity regions 808 are formed. In addition, boron (B) is used as a p-type impurity element, and is selectively introduced into the semiconductor films 805c and 805e so as to be contained at concentrations of greater than or equal to $1\times10^{19}/cm^3$ and less than or equal to $1\times10^{20}/cm^3$. Thus, p-type impurity regions 809 are formed.

Then, an insulating film is formed to cover the gate insulating film 806 and the gate electrodes 807. The insulating film can be formed to have a single layer structure or a stacked structure using a film containing an inorganic material or containing an organic material by a plasma CVD method, a sputtering method, or the like. After that, the insulating film is selectively etched by anisotropic etching which is based on a perpendicular direction to form insulating films 810 (also referred to as sidewalls) which are in contact with sides of the gate electrodes 807. The insulating films 810 are used as masks for doping in forming LDD (Lightly Doped Drain) regions.

Then, using the gate electrodes 807 and the insulating films 810 as masks in addition to masks formed of resist by photolithography, an n-type impurity element is added to the semiconductor films 805a, 805b, 805d, and 805f at high concentration to form n-type impurity regions 811. Here, phosphorus (P) is used as the n-type impurity element. Phosphorus is selectively introduced to the semiconductor films 805a, 805b, 805d, and 805f so as to be contained at concentration of greater than or equal to $1\times10^{19}/cm^3$ and less than or equal to $1\times10^{20}/cm^3$, so that impurity regions 811 containing in the n-type impurity at higher concentration than the impurity regions 808 are formed.

By the above steps, as shown in FIG. 8D, n-channel thin film transistors 800a, 800b, 800d, and 800f and p-channel thin film transistors 800c and 800e are formed.

In the n-channel thin film transistor 800a, a channel formation region is formed in a region of the semiconductor film 805a that is overlapped with the gate electrode 807. Impurity regions 811 in which a source region and a drain region are formed are formed in regions that are not overlapped with the gate electrode 807 and the insulating films 810. Low concentration impurity regions (LDD region) are formed in regions that are overlapped with the insulating films 810 between the channel formation region and the impurity regions 811. Similarly, in each of the n-channel thin film transistors 800b, 800d, and 800f, a channel formation region, low concentration impurity regions, and the impurity regions 811 are formed.

In the p-channel thin film transistor 800c, a channel formation region is formed in a region of the semiconductor film 805c that is overlapped with the gate electrode 807. The impurity regions 809 in which a source region and a drain region are formed are formed in regions that are not overlapped with the gate electrode 807. Similarly, in the p-channel thin film transistor 800e, a channel formation region and the impurity regions 809 are formed. Although an LDD region is not provided in the p-channel thin film transistors 800c and 800e here, an LDD region may be provided in the p-channel thin film transistors, and an LDD region is not necessarily provided in the n-channel thin film transistors.

Next, as shown in FIG. 9A, an insulating film is formed to have a single layer structure or a stacked structure so as to cover the semiconductor films 805a to 805f, the gate electrode 807, and the like, and a conductive films 813 are formed over the insulating film, which is electrically connected to the impurity regions 809 and 811 of the thin film transistors 800a to 800f. The insulating film can be formed by a CVD method, a sputtering method, a SOG method, a droplet discharging method, a screen printing method, or the like. As a material of the insulating film, an inorganic material such as silicon oxide or silicon nitride, an organic material such as polyimide, polyamide, benzocyclobutene, acryl, or epoxy, or the like can be used. Here, the insulating film has a two-layer structure in which a silicon nitride oxide film is formed as a first insulating film 812a, and a silicon oxynitride film is formed as a second insulating film 812b. Note that the conductive film 813 partly form the source electrode and the drain electrode of the semiconductor films 805a to 805f.

The conductive films 813 can be formed by a CVD method, a sputtering method, or the like to have a single layer structure or a stacked structure, using an element selected from aluminum (Al), tungsten (W), titanium (Ti), tantalum (Ta), molybdenum (Mo), nickel (Ni), platinum (Pt), copper (Cu), gold (Au), silver (Ag), manganese (Mn), neodymium (Nd), carbon (C), and silicon (Si), or an alloy material or a compound material containing the element as its main component. An alloy material containing aluminum as its main component corresponds to, for example, a material which contains aluminum as its main component and which also contains nickel, or an alloy material which contains aluminum as its main component and which also contains nickel and one or both of carbon and silicon.

Next, as shown in FIG. 9B, an insulating film 814 is formed to cover the conductive films 813, and conductive films 815a and 815b are formed over the insulating film 814, which are electrically connected to the conductive films 813 partly forming the source electrode or the drain electrode of the semiconductor films 805a and 805f. In addition, conductive films 816a and 816b are formed over the insulating film 814, which are electrically connected to the conductive films 813 partly forming the source electrode or the drain electrode of the semiconductor films 805b and 805e. Note that the conductive films 815a and 815b and the conductive films 816a and 816b may be formed using the same material at the same time. The conductive films 815a and 815b and the conductive films 816a and 816b can be formed using the same material as that of the conductive film 813. Then, conductive films 817a and 817b serving as antennas are formed over the conductive films 816a and 816b.

The insulating film 814 can be formed to have a single layer structure or a stacked structure, using an insulating film containing oxygen and/or nitrogen such as silicon oxide ($SiO_x$), silicon nitride ($SiN_x$), silicon oxynitride ($SiO_xN_y$: x>y>0), or silicon nitride oxide ($SiN_xO_y$: x>y>0); a film containing carbon such as DLC (Diamond-Like Carbon); an organic material such as epoxy, polyimide, polyamide, polyvinyl phenol, benzocyclobutene, or acrylic; or a siloxane material such as a siloxane resin by a CVD method, a sputtering method or the like.

The conductive films 817a and 817b are formed of a conductive material by a CVD method, a sputtering method, a printing method such as screen printing or gravure printing, a droplet discharging method, a dispenser method, a plating method, or the like. The conductive material is formed to have a single layer structure or a stacked structure using an element selected from aluminum (Al), titanium (Ti), silver (Ag), copper (Cu), gold (Au), platinum (Pt), nickel (Ni), palladium (Pd), tantalum (Ta), or molybdenum (Mo), or an alloy material or a compound material containing such an element as its main component.

For example, when the conductive films 817a and 817b serving as an antenna are formed by a screen printing method, a conductive paste in which conductive particles with a grain diameter of several nm to several tens of µm are dissolved or dispersed in an organic resin is selectively printed. The conductive particles can be one or more of metal particles selected from silver (Ag), gold (Au), copper (Cu), nickel (Ni), platinum (Pt), palladium (Pd), tantalum (Ta), molybdenum (Mo), titanium (Ti), and the like; fine particles of silver halide; dispersive nanoparticles of such an element; and the like. In addition, the organic resin included in the conductive paste can be one or more of organic resins which function as a binder, a solvent, a dispersing agent, a coating material of the metal particles, and the like. Typically, an epoxy resin and a silicone resin can be given as examples. It is preferable to perform baking after the conductive paste is printed as above described.

Note that the conductive films 815a and 815b serve as wirings electrically connected to a secondary battery. When the conductive films 817a and 817b serving as antennas are formed, conductive films electrically connected to the conductive films 815a and 815b may be separately formed so as to be wirings connecting the conductive films 815a and 815b to the secondary battery.

Next, as shown in FIG. 9C, after an insulating film 818 is formed to cover the conductive films 817a and 817b, a layer including the thin film transistors 800a to 800f, the conductive films 817a and 817b, and the like (hereinafter, referred to as an "element formation layer 819") is peeled from the substrate 801. Here, after openings are formed in regions where the thin film transistors 800a to 800f are not formed with irradiation of laser light (such as UV light), the element formation layer 819 is peeled from the substrate 801 by physical force. Note that etchant may be introduced to the formed openings to selectively remove the peeling layer 803 before the element formation layer 819 is peeled from the substrate 801. As the etchant, a gas or a liquid containing halogen fluoride or an interhalogen compound is used. For example, chlorine trifluoride ($ClF_3$) is used as the gas containing halogen fluoride. The whole peeling layer 803 may not be removed but part thereof may be left. In this manner, consumption of the etchant can be suppressed and a processing time which is necessary for removing the peeling layer can be shortened. The insulating film 818 can be formed similarly to the insulating film 814.

Figure 10A:
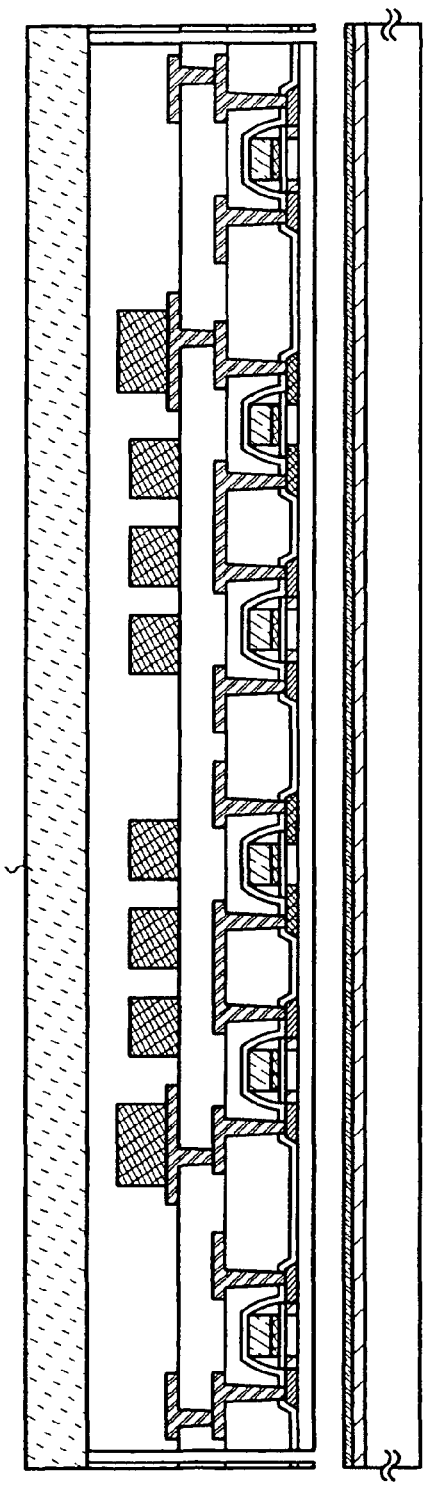
FIGS. 10A and 10B are views showing a method for manufacturing a semiconductor device of the present invention.
Figure 10B:
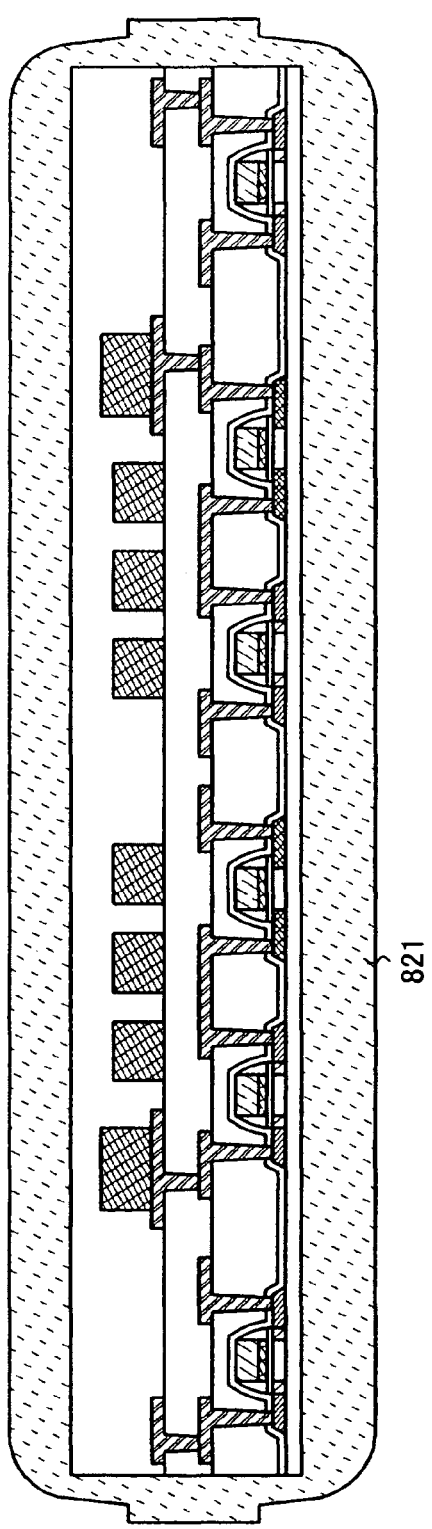

Next, after the openings are formed in the element formation layer 819 by irradiation with laser light, as shown in FIG. 10A, a first sheet material 820 is attached to one of surfaces (where the insulating film 818 is exposed) of the element formation layer 819, and then the element formation layer 819 is peeled from the substrate 801. After a second sheet material 821 is attached to the other surface (surface exposed by peeling) of the element formation layer 819, as shown in FIG. 10B, the first sheet material 820 and the second sheet material 821 are attached to each other by one of or both heating treatment and pressure treatment. As the first sheet material 820 and the second sheet material 821, a hot melt film or the like can be used.

As the first sheet material 820 and the second sheet material 821, a film on which an antistatic treatment for preventing static electricity or the like is performed (hereinafter referred to as an antistatic film) can be used. By using the antistatic film, the case where a semiconductor element is adversely affected by static electricity or the like from the outside can be prevented when the semiconductor device is handled as a product.

The secondary battery is connected to the conductive films 815a and 815b. The connection with the secondary battery may be made before the element formation layer 819 is peeled from the substrate 801 (the step of FIG. 9B or FIG. 9C). Alternatively, the connection may be made after the element formation layer 819 is peeled from the substrate 801 (the step of FIG. 10A) or the element formation layer 819 is sealed with the first and second sheet materials (the step of FIG. 10B).

An example of connection between the element formation layer 819 and the secondary battery will be described with reference to FIGS. 11A to 12B.

In the step of FIG. 9B, conductive films 831a and 831b electrically connected to the conductive films 815a and 815b respectively are formed concurrently with the conductive films 817a and 817b serving as antennas. Then, the insulating film 818 is formed so as to cover the conductive films 817a and 817b and the conductive films 831a and 831b, and openings 832a and 832b are formed so as to expose surfaces of the conductive films 831a and 831b. After the openings are formed in the element formation layer 819 by irradiation with laser light, the first sheet material 820 is attached to the one of surfaces (where the insulating film 818 is exposed) of the element formation layer 819, and the element formation layer 819 is peeled from the substrate 801 (see FIG. 11A).

Next, the second sheet material 821 is attached to the other surface (surface exposed by the peeling) of the element formation layer 819, and the element formation layer 819 is peeled from the first sheet material 820 (see FIG. 11B). Therefore, the material with weak adhesion is preferably used here as the first sheet material 820. Then, conductive films 834a and 834b are selectively formed, which are electrically connected to the conductive films 831a and 831b, through the openings 832a and 832b, respectively.

The conductive films 834a and 834b are formed of a conductive material by a CVD method, a sputtering method, a printing method such as screen printing or gravure printing, a droplet discharging method, a dispenser method, a plating method, or the like. The conductive material is formed using an element selected from aluminum (Al), titanium (Ti), silver (Ag), copper (Cu), gold (Au), platinum (Pt), nickel (Ni), palladium (Pd), tantalum (Ta), or molybdenum (Mo), or an alloy material or a compound material containing the element as its main component.

Although an example is shown here, in which the conductive films 834a and 834b are formed after peeling of the element formation layer 819 from the substrate 801, the element formation layer 819 may be peeled from the substrate 801 after the conductive films 834a and 834b are formed.

Figure 12A:
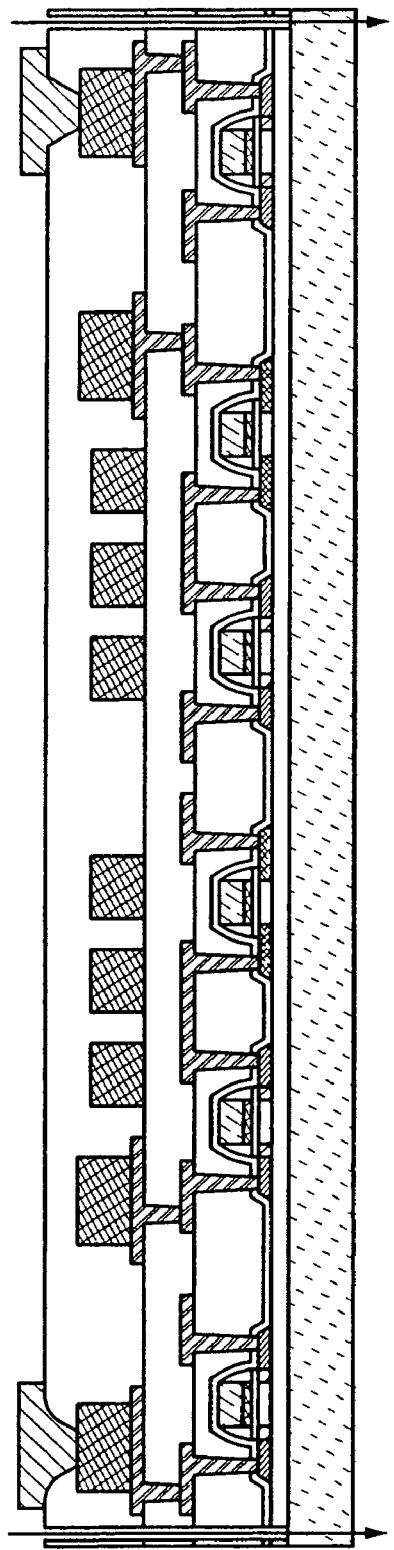
FIGS. 12A and 12B are views showing a method for manufacturing a semiconductor device of the present invention.

Next, as shown in FIG. 12A, the element formation layer 819 is divided into individual elements. A laser irradiation apparatus, a dicing apparatus, a scribing apparatus, or the like can be used for the division.

Figure 12B:
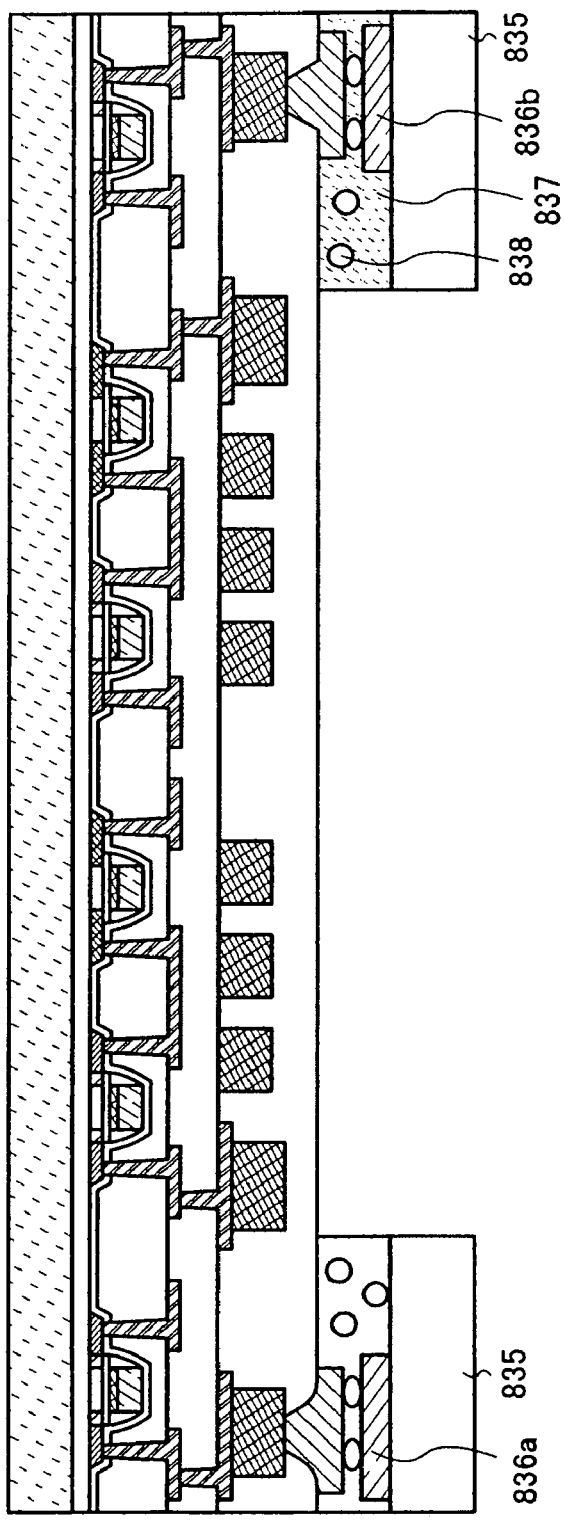

Next, as shown in FIG. 12B, the divided elements are electrically connected to the secondary battery. Here, the conductive films 834a and 834b provided for the element formation layer 819 and conductive films 836a and 836b each serving as a connection terminal are respectively connected. Note that secondary batteries are formed over substrates 835 provided with the conductive films 836a and 836b. For the connection between the conductive film 834a and the conductive film 836a and between the conductive film 834b and the conductive film 836b, an adhesive material such as an anisotropic conductive film or an anisotropic conductive paste can be used. Here, an example is shown, in which connection is made using conductive particles 838 included in an adhesive resin 837. In addition, a conductive adhesive agent such as a silver paste, a copper paste, and a carbon paste or a solder joint method can be used for connection.

This embodiment mode can be combined with Embodiment Mode 1 to 5 as appropriate.

Embodiment Mode 7

Figure 13A:
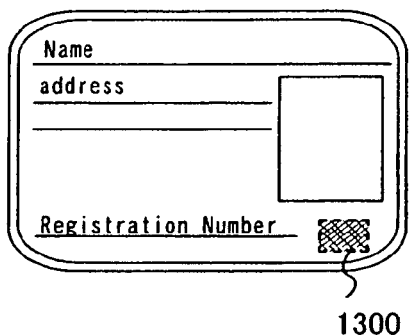
FIGS. 13A to 13F are views each showing a usage example of a semiconductor device of the present invention.
Figure 13B:
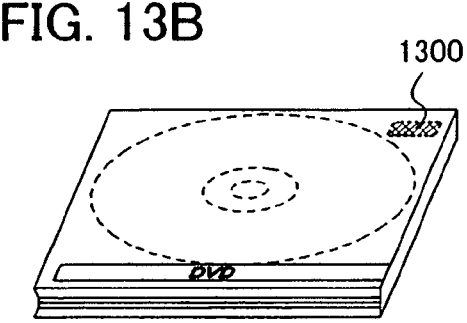
Figure 13C:
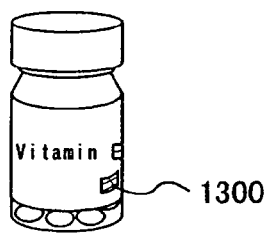
Figure 13D:
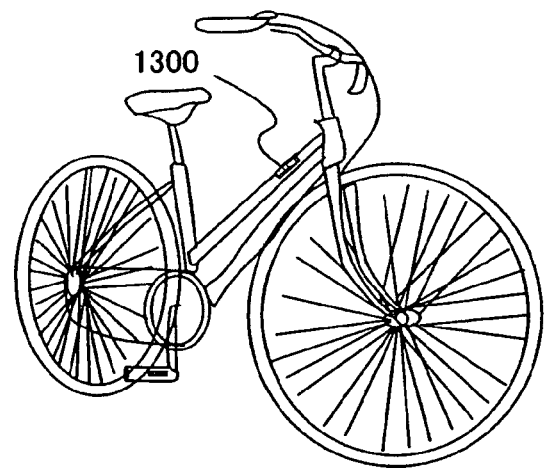
Figure 13E:
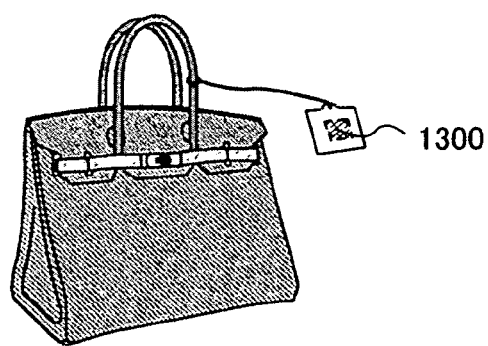
Figure 13F:
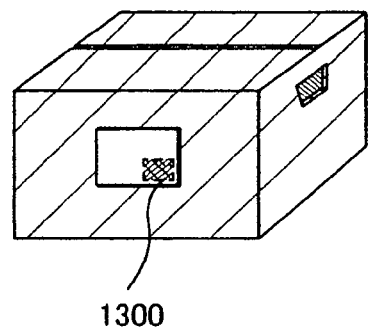
Figure 14A:
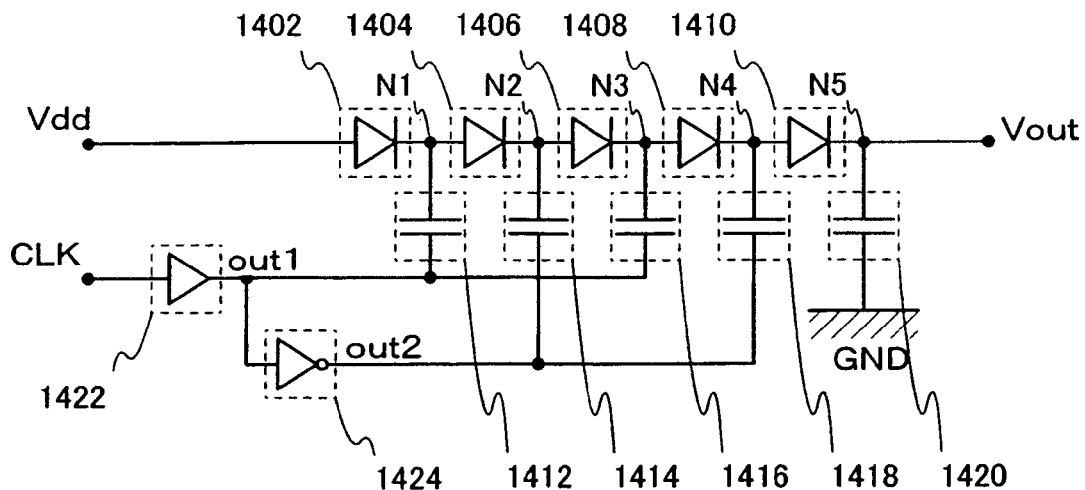
FIGS. 14A to 14C are diagrams showing a structure of a conventional DC/DC converter.
Figure 14B:
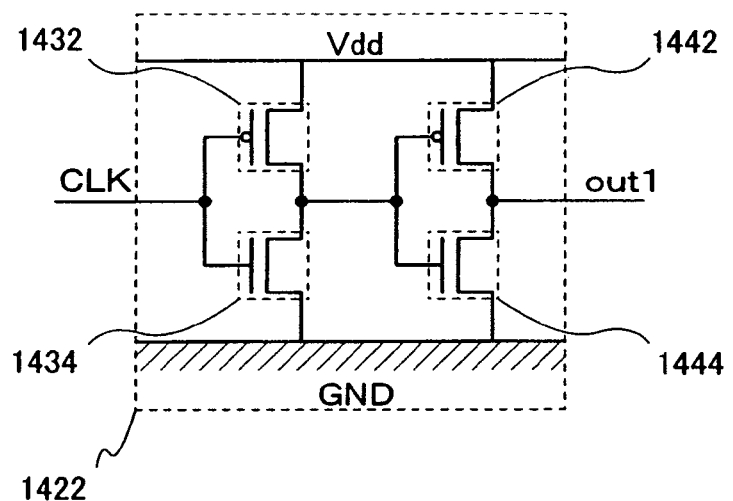
Figure 14C:
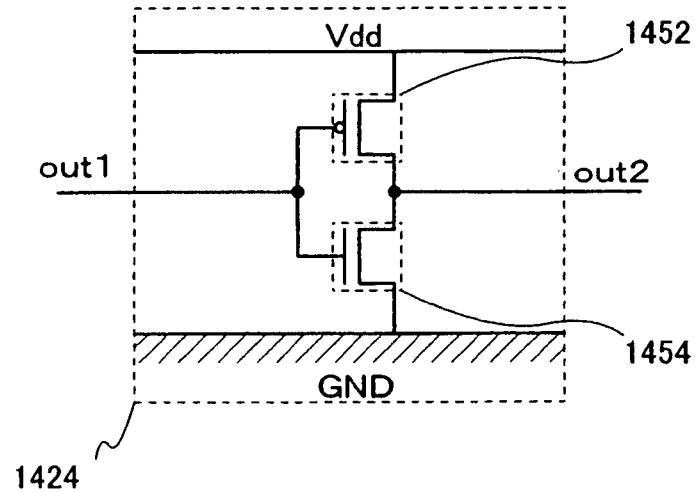
Figure 15:
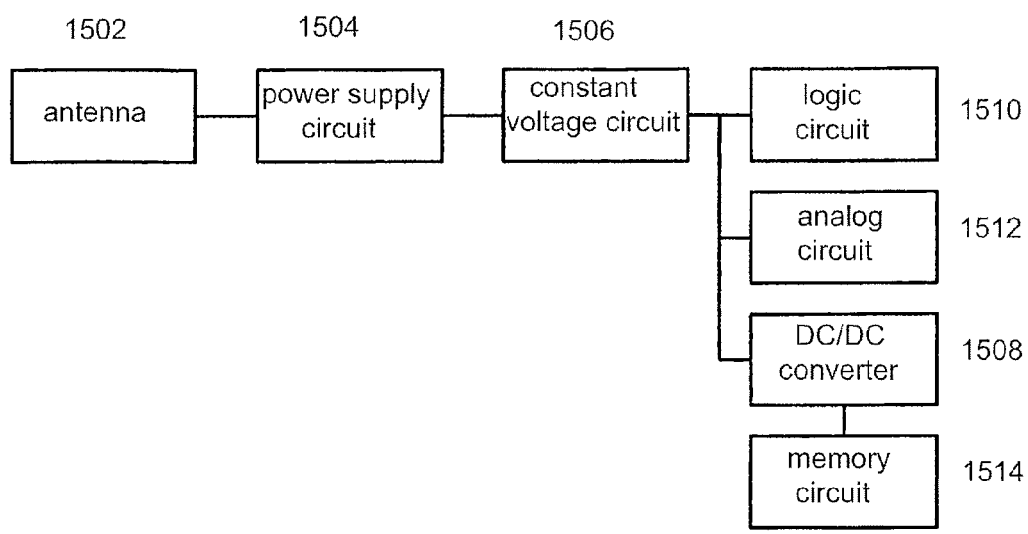
FIG. 15 is a view showing a structure of a conventional semiconductor device.

In accordance with the present invention, a semiconductor device functioning as an RFID tag can be formed. An RFID tag can be used in a wide variety of applications, and may be used by being mounted on objects such as bills, coins, securities, bearer bonds, certificates (driver's licenses, resident cards, and the like, see FIG. 13A), containers for wrapping objects (wrapping paper, bottles, and the like, see FIG. 13C), recording media (DVD software, video tapes, and the like, see FIG. 13B), vehicles (bicycles and the like, see FIG. 13D), personal belongings (bags, glasses, and the like), foods, plants, clothes, lifestyle goods, and products such as electronic devices, or shipping tags of baggage (see FIGS. 13E and 13F). Note that the RFID tags are indicated by reference numeral 1300 in FIGS. 13A to 13F.

Note that the electronic device indicates a liquid crystal display device, an EL display device, a television unit (also simply referred to as a TV, a TV receiver, or a television receiver), a cellular phone, and the like for example. In addition, the above-described semiconductor device can be used for animals, human bodies, or the like.

The RFID tag is attached to a surface of an object, or incorporated to be fixed on an object. For example, the RFID tag may be incorporated in paper of a book, or an organic resin of a container for wrapping an object to be fixed on each object. By providing a wireless chip in bills, coins, securities, bearer bonds, certificates, and the like, forgery can be prevented. Further, by providing a wireless chip in containers for wrapping objects, recording media, personal belongings, foods, clothes, lifestyle goods, electronic devices, and the like, inspection systems, rental systems and the like can be performed more efficiently.

In an RFID tag that can be manufactured by the present invention, as power for charging a capacitor in a DC/DC converter, power supplied from not an antenna but a secondary battery is used. Accordingly, stability of power supplied from the antenna can be attempted. Thus, operation of the RFID tag can be stabilized.

When an RFID tag that can be formed in accordance with the present invention is applied to management system or a distribution system of articles, the system can have high functionality. For example, information which is recorded in an RFID tag provided in a tag is read by a reader/writer provided near a conveyor belt, then information about a distribution process or a delivery destination is read out, and inspection of merchandise or distribution of goods can be easily carried out.

This embodiment mode can be combined with Embodiment Modes 1 to 6 as appropriate.

This application is based on Japanese Patent Application serial no. 2006-335643 filed with Japan Patent Office on Dec. 13, 2006, the entire contents of which are hereby incorporated by reference.

What is claimed is:

1. A semiconductor device comprising:
a DC/DC converter including:
n number of diodes connected in series between an input terminal and an output terminal of the DC/DC converter (n: an integer, $3 \leq n$),
(n−1) number of capacitors each including a first electrode and a second electrode, wherein the first electrode of one of the (n−1) number of capacitors is connected to an output terminal of one of n number of diodes,
a circuit to supply a first potential from an antenna and connected to the input terminal of the DC/DC converter;
a potential supply circuit to supply a second potential from a secondary battery or a third potential selectively and connected to the second electrodes of the (n−1) number of capacitors; and
wherein the potential supply circuit is a circuit by which the third potential is supplied to the second electrode of a (2k−1)-th capacitor when the second potential is supplied to the second electrode of a 2k-th capacitor (k: an integer, $2k \leq n-1$ and $2k-1 \leq n-1$), and by which the second potential is supplied to the second electrode of the (2k−1)-th capacitor when the third potential is supplied to the second electrode of the 2k-th capacitor.

2. A semiconductor device comprising:
a DC/DC converter including:
n number of diodes connected in series between an input terminal and an output terminal of the DC/DC converter (n: an integer, $3 \leq n$); and
n number of capacitors each including a first electrode and a second electrode, wherein the first electrode of one of the n number of capacitors is connected to an output terminal of one of n number of diodes,
a circuit to supply a first potential from an antenna and connected to the input terminal of the DC/DC converter;
a potential supply circuit to supply a second potential from a secondary battery or a third potential selectively and connected to the second electrodes of first to (n−1)-th capacitors,
wherein a circuit to supply the third potential is connected to the second electrode of a n-th capacitor; and
wherein the potential supply circuit is a circuit by which the third potential is supplied to the second electrode of a (2k−1)-th capacitor when the second potential is supplied to the second electrode of a 2k-th capacitor (k: an integer, $2k \leq n-1$ and $2k-1 \leq n-1$), and by which the second potential is supplied to the second electrode of the (2k−1)-th capacitor when the third potential is supplied to the second electrode of the 2k-th capacitor.

3. A semiconductor device according to claim 1 or 2, wherein the third potential is a ground potential.

4. A semiconductor device according to claim 1 or 2, wherein the potential supply circuit is provided with a circuit to switch destinations of the second potential and the third potential alternatively.

5. A semiconductor device according to claim 1 or 2, wherein the potential supply circuit is provided with a buffer circuit or an inverter circuit.

6. A semiconductor device according to claim 1 or 2, wherein the secondary battery is charged by receiving power supplied wirelessly and is used as a power supply to supply the second potential.

7. A semiconductor device according to claim 1 or 2, wherein the secondary battery is charged by receiving power supplied wirelessly and is used as a power supply to supply the first potential.

8. A semiconductor device comprising:
a DC/DC converter including:
- n number of diodes connected in series between an input terminal and an output terminal of the DC/DC converter (n: an integer, $3 \leq n$); and
- n number of capacitors each including a first electrode and a second electrode, wherein the first electrode of one of the n number of capacitors is connected to an output terminal of one of n number of diodes,
- a first potential supplied to the input terminal of the DC/DC converter from an antenna; and
- a potential supply circuit to supply a second potential from a secondary battery or a third potential selectively and connected to the other terminals of the (n−1) number of capacitors;
- wherein the third potential is supplied to the second electrode of an n-th capacitor, and
- wherein the potential supply circuit is a circuit by which the third potential is supplied to the second electrode of a (2k−1)-th capacitor when the second potential is supplied to the other terminal of a 2k-th capacitor (k: an integer, $2k \leq n-1$ and $2k-1 \leq n-1$), and by which the second potential is supplied to the second electrode of the (2k−1)-th capacitor when the third potential is supplied to the second electrode of the 2k-th capacitor.

9. A semiconductor device according to claim 8,
wherein the third potential is a ground potential.

10. A semiconductor device according to claim 8,
wherein the potential supply circuit is provided with a circuit to switch destinations of the second potential and the third potential alternatively.

11. A semiconductor device according to claim 8,
wherein the potential supply circuit is provided with a buffer circuit or an inverter circuit.

12. A semiconductor device according to claim 8,
wherein the secondary battery is a secondary battery that is charged by receiving power supplied wirelessly.

13. A semiconductor device according to claim 8,
wherein a potential from the secondary battery that is charged through a charge circuit by receiving power supplied wirelessly is used.

14. A semiconductor device comprising:
a DC/DC converter including:
- n number of diodes connected in series between an input terminal and an output terminal of the DC/DC converter (n: an integer, $3 \leq n$); and
- n number of capacitors each including a first electrode and a second electrode, wherein the first electrode of one of the n number of capacitors is connected to an output terminal of one of n number of diodes,
- a circuit to supply a first potential from a first antenna and connected to the input terminal of the DC/DC converter; and
- a potential supply circuit to supply a second potential from a secondary battery that is charged by receiving power supplied from a second antenna or a third potential selectively and connected to the other terminals of first to (n−1)-th capacitors;
- wherein the third potential is supplied to the second electrode of an n-th capacitor; and
- wherein the potential supply circuit is a circuit by which the third potential is supplied to the second electrode of a (2k−1)-th capacitor when the second potential is supplied to the second electrode of a 2k-th capacitor (k: an integer, $2k \leq n-1$ and $2k-1 \leq n-1$), and by which the second potential is supplied to the second electrode of the (2k−1)-th capacitor when the third potential is supplied to the second electrode of the 2k-th capacitor.

15. A semiconductor device according to claim 14,
wherein the third potential is a ground potential.

16. A semiconductor device according to claim 14,
wherein the potential supply circuit is provided with a circuit to switch destinations of the second potential and the third potential alternatively.

17. A semiconductor device according to claim 14,
wherein the potential supply circuit is provided with a buffer circuit or an inverter circuit.

* * * * *